(12) United States Patent
Heffernan

(10) Patent No.: US 12,247,674 B2
(45) Date of Patent: Mar. 11, 2025

(54) ECLIPSE VALVE ASSEMBLY

(71) Applicant: Chad Heffernan, Village of Palmetto Bay, FL (US)

(72) Inventor: Chad Heffernan, Village of Palmetto Bay, FL (US)

( * ) Notice: Subject to any disclaimer, the term of this patent is extended or adjusted under 35 U.S.C. 154(b) by 15 days.

(21) Appl. No.: 18/118,607

(22) Filed: Mar. 7, 2023

(65) Prior Publication Data

US 2023/0250881 A1 Aug. 10, 2023

Related U.S. Application Data

(63) Continuation-in-part of application No. 17/522,140, filed on Nov. 9, 2021, now Pat. No. 11,598,429, which is a continuation-in-part of application No. 17/151,471, filed on Jan. 18, 2021, now Pat. No. 11,168,795.

(51) Int. Cl.
*F16K 31/54* (2006.01)
*F16K 3/02* (2006.01)
*F16K 31/53* (2006.01)

(52) U.S. Cl.
CPC ............ *F16K 3/029* (2013.01); *F16K 3/0254* (2013.01); *F16K 31/53* (2013.01); *F16K 31/54* (2013.01)

(58) Field of Classification Search
CPC . F16K 3/029; F16K 3/08; F16K 3/085; F16K 31/53; F16K 31/535; F16K 31/54; F16K 3/0254
See application file for complete search history.

(56) References Cited

U.S. PATENT DOCUMENTS

| 6,414 | A | * | 5/1849 | Scowden | ................ F16K 31/54 |
| | | | | | 251/250 |
| 1,165,224 | A | | 12/1915 | Cadett | |
| 1,247,682 | A | | 11/1917 | Howell | |
| 1,592,471 | A | * | 7/1926 | Smolensky | ............. F16K 3/085 |
| | | | | | 251/192 |
| 1,788,763 | A | * | 1/1931 | Gant | ....................... E21B 35/00 |
| | | | | | 251/1.3 |
| 1,949,011 | A | * | 2/1934 | Fahey | ....................... F16K 1/16 |
| | | | | | 251/298 |
| 1,964,663 | A | * | 6/1934 | Gossler | ..................... F02D 9/14 |
| | | | | | 251/285 |

(Continued)

FOREIGN PATENT DOCUMENTS

DE 610964 C * 3/1935

*Primary Examiner* — Craig J Price
(74) *Attorney, Agent, or Firm* — The Concept Law Group, PA; Scott D. Smiley; Scott M. Garrett

(57) ABSTRACT

An eclipse valve includes at least two obturator plates captured in a sealed housing that are driven to move in opposite directions relative to each other within the sealed housing. The obturator plates fill the width of a cavity within the housing and can be moved between aligned and unaligned positions. Each of the obturator plates have an opening through the plate, and when the obturator plates are aligned, the openings through the plates are aligned with each other, and with front and rear openings in the housing, allowing flow through the valve. The plates can be moved to reduce the overlap of the openings through the plates within the housing in an eclipse manner to adjust the rate or amount of flow, and to shut off flow by completely un-aligning the openings.

11 Claims, 27 Drawing Sheets

(56) References Cited

U.S. PATENT DOCUMENTS

| | | | |
|---|---|---|---|
| 2,076,336 A * | 4/1937 | Fahey | F16K 1/2007 |
| | | | 137/546 |
| 2,217,216 A | 10/1940 | Davis | |
| 2,235,612 A | 3/1941 | Graney | |
| 2,254,268 A * | 9/1941 | Church | F16K 3/085 |
| | | | 251/192 |
| 2,502,689 A | 4/1950 | Yant | |
| 2,504,924 A * | 4/1950 | Fennema | F16K 3/186 |
| | | | 251/167 |
| 2,537,470 A * | 1/1951 | Laurent | F16K 3/186 |
| | | | 251/167 |
| 2,850,260 A | 9/1958 | Perazone et al. | |
| 3,329,396 A | 7/1967 | Heaton et al. | |
| 3,787,022 A | 1/1974 | Wilcox | |
| 4,097,562 A * | 6/1978 | Blakeway | F02M 9/06 |
| | | | 261/DIG. 39 |
| 4,193,574 A * | 3/1980 | Barnes | E21B 33/062 |
| | | | 251/1.3 |
| 4,432,387 A * | 2/1984 | Sims | F16K 3/085 |
| | | | 137/329.02 |
| 4,513,948 A | 4/1985 | Konig | |
| 4,532,961 A * | 8/1985 | Walton | F16K 47/045 |
| | | | 251/212 |
| 4,821,764 A * | 4/1989 | Brenez | F16K 3/085 |
| | | | 137/625.41 |
| 5,033,519 A | 7/1991 | Puffer et al. | |
| 5,160,119 A | 11/1992 | Lemire et al. | |
| 5,389,081 A | 2/1995 | Castro | |
| 5,722,636 A | 3/1998 | Houston | |
| 5,743,296 A | 4/1998 | Bosch | |
| 6,666,237 B2 | 12/2003 | De Antoni Migliorati et al. | |
| 6,920,864 B1 | 7/2005 | Roche et al. | |
| 7,666,180 B2 | 2/2010 | Holsten et al. | |
| 7,837,176 B2 * | 11/2010 | Loga | F16K 31/54 |
| | | | 251/285 |
| 8,082,947 B2 * | 12/2011 | Chang | F16K 31/535 |
| | | | 251/249 |
| 8,196,610 B2 | 6/2012 | Murakami et al. | |
| 8,302,630 B2 * | 11/2012 | Palmer | F16K 3/029 |
| | | | 137/625.42 |
| 8,496,228 B2 * | 7/2013 | Burgess | F16K 31/535 |
| | | | 251/315.1 |
| 9,000,177 B2 * | 4/2015 | Delcanale | A61K 31/44 |
| | | | 546/301 |
| 9,017,460 B2 * | 4/2015 | Minato | F16K 1/00 |
| | | | 96/147 |
| 9,091,351 B2 * | 7/2015 | DeOcampo | F16K 37/0041 |
| 9,103,421 B2 * | 8/2015 | Lobo | F16K 31/53 |
| 9,404,561 B2 * | 8/2016 | Lobo | F16K 31/53 |
| 9,464,721 B2 | 10/2016 | Yang et al. | |
| 10,247,594 B2 * | 4/2019 | Smith | G01F 15/185 |
| 10,508,743 B2 | 12/2019 | Wakayama et al. | |
| 11,067,198 B1 | 7/2021 | Peng | |
| 11,168,795 B1 | 11/2021 | Heffernan | |
| 11,287,058 B2 * | 3/2022 | Horikawa | F16K 31/5286 |
| 11,306,828 B2 * | 4/2022 | Chen | F16K 27/067 |
| 11,398,390 B2 * | 7/2022 | Ahn | H01L 21/67069 |
| 11,435,001 B2 * | 9/2022 | Kalimuthu | F16K 27/044 |
| 11,598,429 B2 * | 3/2023 | Heffernan | F16K 31/54 |
| 11,885,438 B2 * | 1/2024 | Haro-Valdez | F16K 5/0407 |
| 2011/0180737 A1 * | 7/2011 | Moench | F16K 31/535 |
| | | | 251/248 |
| 2012/0192954 A1 * | 8/2012 | Jorgenson | F16K 3/10 |
| | | | 251/210 |
| 2013/0056670 A1 * | 3/2013 | Palmer | F16K 3/029 |
| | | | 251/326 |
| 2017/0067564 A1 * | 3/2017 | Nagumo | H01L 21/67017 |
| 2017/0356552 A1 * | 12/2017 | Cassel | F16K 31/535 |

* cited by examiner

ECLIPSE VALVE ASSEMBLY

CROSS REFERENCE

This application is a continuation in part of U.S. patent application Ser. No. 17/522,140, filed Nov. 9, 2021, which was a continuation in part of U.S. patent application Ser. No. 17/151,471, filed Jan. 18, 2021, the entireties of each of which are hereby incorporated by reference.

FIELD OF THE INVENTION

The present disclosure relates generally to valve systems and, more particularly, relates to a valve having opposing, and oppositely moving obturator plates contained within a valve housing that, when moved relative to each other within the valve housing, open or close a pathway through the plates by aligning or de-aligning corresponding openings or apertures through each plate.

BACKGROUND OF THE INVENTION

Conventional valve designs have inherent flaws that do not lend to performing well in both flow regulation and flow stoppage. Conventional valve designs are intended to perform well at one task or the other, and rarely both. Therefore, when designing a flow system, where the system or process requirements call for both good flow regulation and stoppage capability (e.g. no leaks), a stop valve and a regulation valve ("block and bleed") are both required, and are coupled in series. However this configuration leads to extra size, weight, expense, power consumption, and complexity. In addition, the turbulent fluid path that results can cause cavitation and water hammer (system shock), affecting the potential lifespan of the valves, piping and hosing, or the system altogether. Additionally, many valve designs do not allow service or replacement to the obturator elements and other valve components that experience wear over time, requiring the valve assembly to be removed and replaced in its entirety when it begins to function sub-optimally. This increases down time of a system and often requires specially trained technicians to replace the valves. Also, the soft seals are directly in the flow path, leading to greater wear of the sealing surfaces.

One approach to solve the above described problems is a shutter valve such as that shown and taught in U.S. Pat. No. 9,970,554. The shutter valve consists of three or more obturator elements ("petals") that each rotate into a portion of the lumen of the flow path and lock into position with each other for full stop, and each retreat into the valve body for full open. This removes all obstructions to the flow of gases and liquids when the valve is in the open position. However, the shutter valve construction consists of many moving parts, complex construction, and an inability to service while mounted in line. Other valve designs, such as the choke valve separator taught in published U.S. Patent App. No. 2018/0093203, allow in line service and full flow stop, but no ability to open full bore, and therefore requires larger schedule piping to obtain the appropriate amount of flow.

Therefore, a need exists to overcome the problems with the prior art as discussed above.

SUMMARY OF THE INVENTION

In accordance with some embodiments of the inventive disclosure, there is provided an eclipse valve that includes a housing having a cavity, wherein the cavity is bounded by a front wall of the housing, and has a back wall that is opposite the front wall. The valve further includes a front fitting formed at an outside of the front wall that includes a front opening through the front wall. Also, a back fitting formed at an outside of the back wall that includes a back opening through the back wall. The front and back openings are aligned from front to back, and a flow axis is defined through the eclipse valve from the front fitting to the back fitting. There is also included a first obturator plate disposed in the cavity against the front wall, and a second obturator plate disposed in the cavity against the back wall. The first and second obturator plates are configured to move within the cavity in opposite directions while remaining in contact with the front wall, the back wall, and each other, respectively. The first obturator plate has an opening through it in a direction from the front wall to the back wall, and has a drive extension which extends from a main portion of the first obturator plate. Likewise, the second obturator plate has an opening through it in a direction from the front wall to the back wall. The second obturator plate also has a drive extension which extends from a main portion of the second obturator plate opposite of and facing the drive extension of the first obturator plate in a direction from front to rear of the housing. There is also a driver element positioned horizontally between, and in contact with both the drive extension of the first obturator plate and the drive extension of the second obturator plate. The first and second obturator plates are moveable, by rotation of the driver element, in the cavity between an open position where the opening through the first obturator plate and the opening through the second obturator plate are both aligned with each other and with the front opening and the back opening, and a closed position where the first and second obturator plates are moved in opposite directions relative to each other. In the closed position the opening through the first obturator plate is completely unaligned (non-aligned) from the opening through the second obturator plate.

In accordance with a further feature, a center of the first obturator plate and a center of the second obturator plate are on a common axis in a direction from the front of the housing to the rear of the housing, wherein the driver element drives the first and second obturator plates to rotate in opposite directions about their centers, respectively.

In accordance with a further feature, the first and second obturator plates are circular about their respective centers.

In accordance with a further feature, an interface between the first obturator plate and the second obturator plate includes a bevel that, when moved to the closed position forces the first and second obturator plates outward relative to each other such that the first obturator plate is pressed against the front wall and the second obturator plate is pressed against the back wall.

In accordance with a further feature, the first obturator plate includes an O-ring positioned between the first obturator plate and the front wall. The O-ring defines a boundary that encircles the front opening in both the open and closed positions. The second obturator plate includes an O-ring positioned between the second obturator plate and the back wall. The O-ring of the second obturator plate defines a boundary that encircles the back opening in both the open and closed positions.

In accordance with a further feature, the driver element is a horizontally oriented pinion gear having angled gear teeth wherein the top of the teeth are located farther outward than the bottom of the teeth.

In accordance with a further feature, the pinion gear is coupled to a shaft that extends through a cover of the housing.

In accordance with some embodiments of the inventive disclosure, there is provided an eclipse valve that includes a housing including a lower housing that has a front wall and a back wall and which defines a cavity. The housing further includes a cover that is configured to cover and seal the cavity at a top of the lower housing. There is an axis of flow defined in a direction from the front wall to the back wall from an opening in front wall to an opening in the back wall. The eclipse valve further includes a first obturator plate disposed in the cavity that has a horizontal center axis, a main portion, and a drive extension the extends outward from the main portion on a first side of the first obturator plate proximate the front wall of the lower housing. The drive extension includes a plurality of gear teeth arranged in an arc around the center axis of the first obturator plate. There is also an opening formed in a horizontal direction through the first obturator plate that is completely offset from the center axis. There is also a second obturator plate disposed in the cavity that has a horizontal center axis, a main portion, and a drive extension that extends outward from the main portion on a first side of the second obturator plate proximate the back wall of the lower housing. The drive extension includes a plurality of gear teeth arranged in an arc around the center axis of the second obturator plate. The second obturator plate also has an opening formed in a horizontal direction through it that is completely offset from the center axis. The center axis of the first obturator plate and the center axis of the second obturator plate are coaxial, and wherein a second side of the first obturator plate, which is opposite the first side of the first obturator plate, is in contact with a second side of the second obturator plate, which is opposite the first side of the second obturator plate. There is also included a drive gear positioned horizontally over the first and second obturator plates. The drive gearing has teeth that are engaged with the teeth of the drive extension of the first obturator plate and the teeth of the drive extension of the second obturator plate. The drive gear is operable to turn the first obturator plate and the second obturator plate in opposite directions about their respective center axes. The drive gear is further operable to turn the first and second obturator plates between an open position in which the opening through the first obturator plate, the opening through the second obturator plate, the opening in the front wall and the opening in the back wall of the lower housing are aligned, and a closed position in which the opening through the first obturator plate and the opening through the second obturator plate are non-aligned.

In accordance with a further feature, the first side of the first obturator plate includes an O-ring that is in contact with the front wall of the lower housing and which encircles the opening through the front wall. The first side of the second obturator plate includes an O-ring that is in contact with the back wall of the lower housing and which encircles the opening through the back wall.

In accordance with a further feature, the second side of at least one of the first or second obturator plates comprises a beveled surface that causes the first and second obturator plates to be urged outward, against the front wall and the back wall, respectively, when the first and second obturator plates are in the closed position.

In accordance with a further feature, the drive gear is coupled to a shaft that extend through the cover of the housing.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
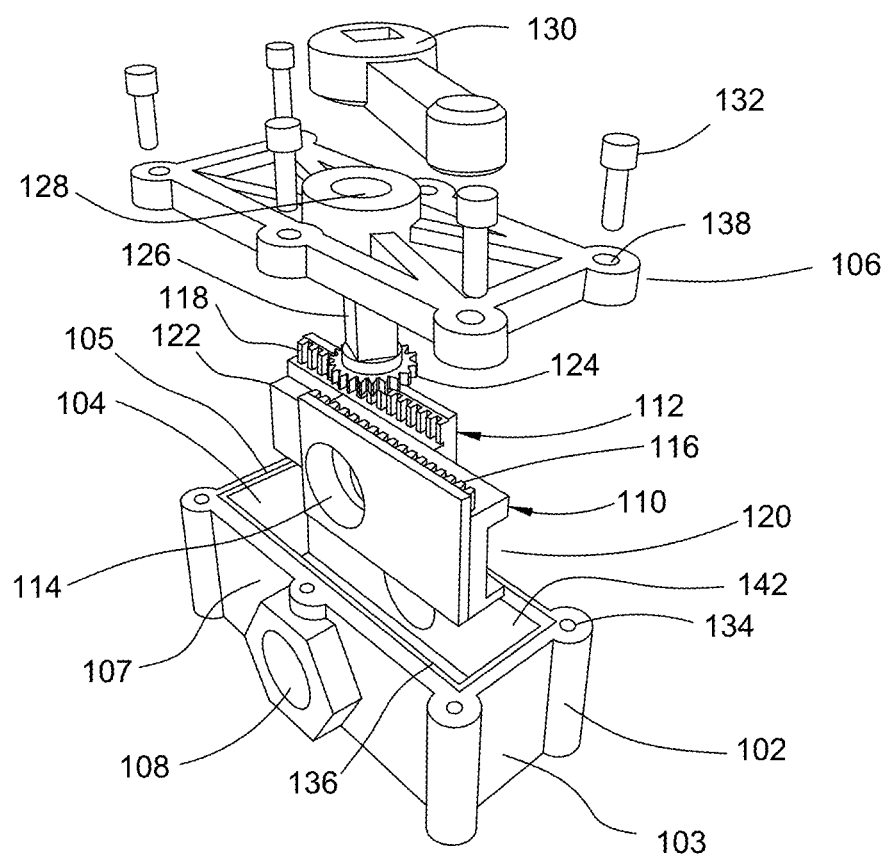
FIG. 1 is a front exploded perspective view of an eclipse valve, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient valve for industrial and other applications. The valve uses two obturator plates that each have a respective opening through them, and which are moved in opposite direction with the valve housing such that each plate eclipses the opening of the other to close the valve, and when the plates are moved to align the openings the valve is open. The inventive valve uses just three moving parts, which is substantially simpler that some prior art designs, such as shutter valves. In the following drawings reference numerals are carried forward to refer to the same features among the drawings. However, because of the various views, not every reference numeral is used in every drawing.

Figure 2:
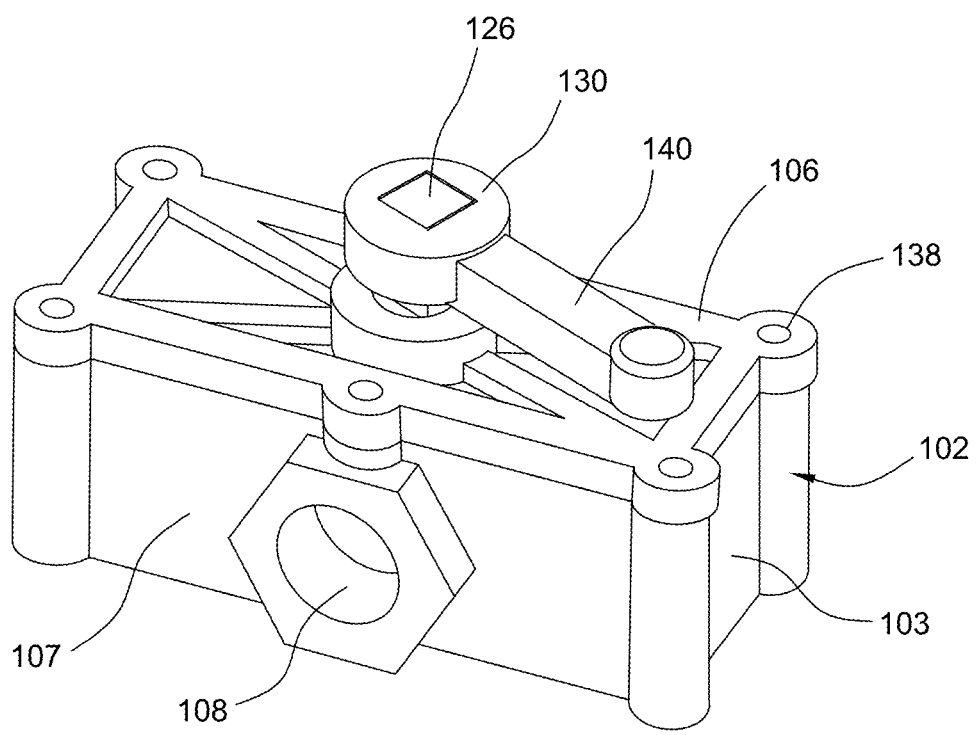
FIG. 2 is a front perspective view of an assembled eclipse valve, in accordance with some embodiments.
Figure 3:
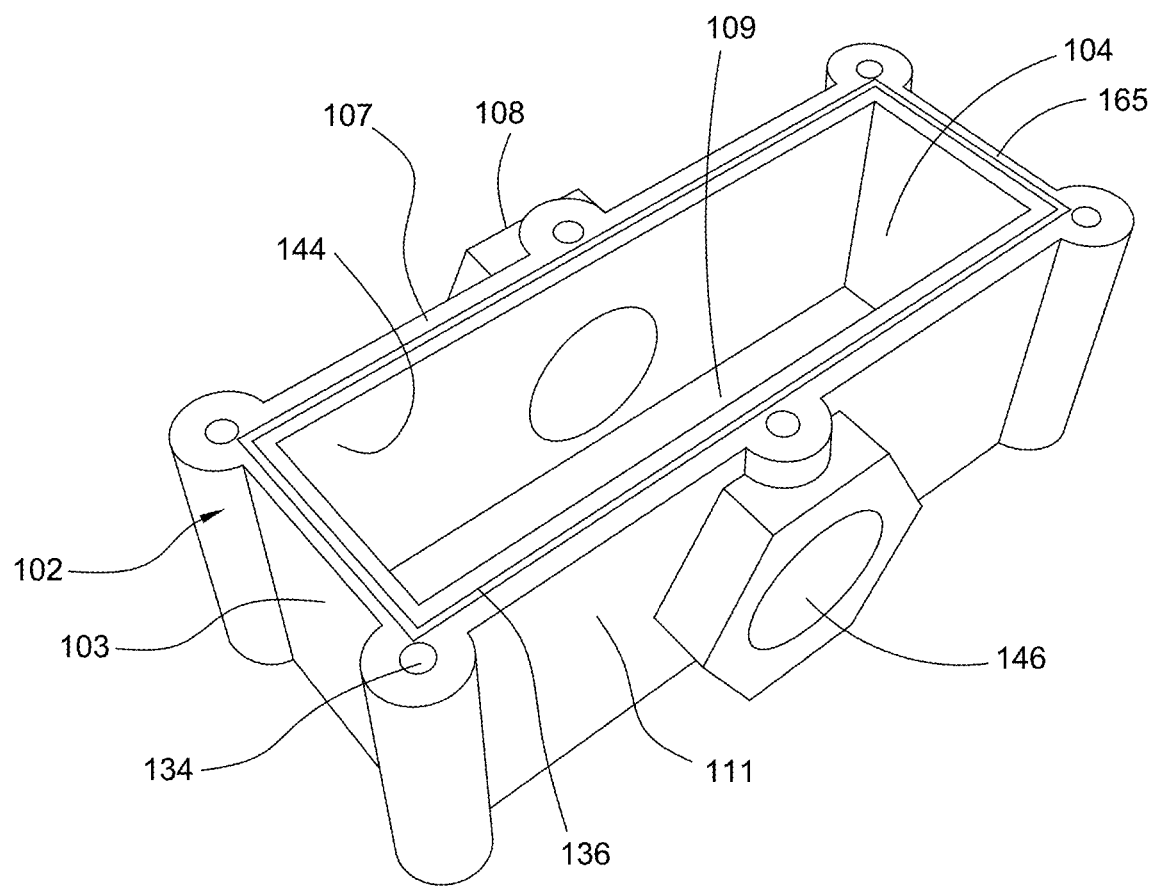
FIG. 3 is a top perspective view of a housing for an eclipse valve, in accordance with some embodiments.

FIG. 1 is a front exploded perspective view of an eclipse valve 100, in accordance with some embodiments. In the following description reference should be made to all of the drawings in FIGS. 1-12 as certain features, due to the various view angles, may be seen in some of the drawings and not in others. FIG. 2 shows the assembled valve 100 having a manual drive configuration. FIG. 3 shows the valve housing 102 by itself.

The valve 100 includes a valve housing 102, or simply, a housing 102. The housing 102 defines a cavity 104 in the interior of the housing 102. The cavity 104 is bounded by a floor 109 (e.g. FIG. 3), a front wall 107, and back wall 111, a right side wall 103 and a left side wall 105, and the cover 106. The length of the cavity 104 is defined as the distance from the right side wall 103 to the left side wall 105, and the width of the cavity 104 is defined as the distance from the front wall 107 to the back wall 111, inside the cavity 104. Inside the cavity 104 there is a first obturator plate 110 and a second obturator plate 112. The obturator plates 110, 112 fit into the cavity such that, along the width of the cavity, the first obturator plate 110 slidably bears against the inside surface 144 of the front wall 107, and the second obturator plate 112 slidably bears against the inside surface 142 of the back wall 111, while the obturator plates 110, 112 also slidably bear against each other at their interface. The phrase "slidably bears against" means that the obturator plates are in contact with the wall and each other, but can slide across the walls and each other. The mating interfaces form a seal despite being able to move, as is well known in valve design. Additionally, the surfaces of the walls 107, 111 and the exterior surface of the obturator plate are similarly shaped to maximize contact. In some embodiments the interior walls (e.g. 142, 144) of the cavity and the exterior side faces of the obturator plates 110, 112 can be flat. In some embodiments the cavity 104 can be rectanguloid in shape. Furthermore, the obturator plates 110, 112 are in sliding contact with each other in the central region of the cavity 104, forming a similar surface to surface engagement that allows the two plates 110, 112 to slide back and forth past each other. The contact between the plates 110, 112, and the walls 107, 111 and each other is such that they form a seal as occurs, for example, in brass ball valves. Accordingly, the obturator plates 110, 112 can be made of a relatively soft metal such as brass, or similar materials that allow for watertight seals at the interfaces of the plates to the walls of the housing, as well as to each other.

The front wall 107 of the housing 102 includes a fitting for coupling the valve 100 to a piping element. Likewise, the back wall 111 also has a fitting that is inline, through the valve 100 with the fitting at the front wall 107. The fittings can be threaded to facilitate threaded engagement with piping elements. Accordingly, the front fitting surrounds affront housing opening 108 through the front wall 107, and the back fitting surround a corresponding back housing opening 146 through the back wall 111. The front housing opening 108 and the back housing opening 146 are aligned on a flow axis 160 (see FIG. 4) to allow flow through the valve 100 when the valve 100 is open.

Figure 5:
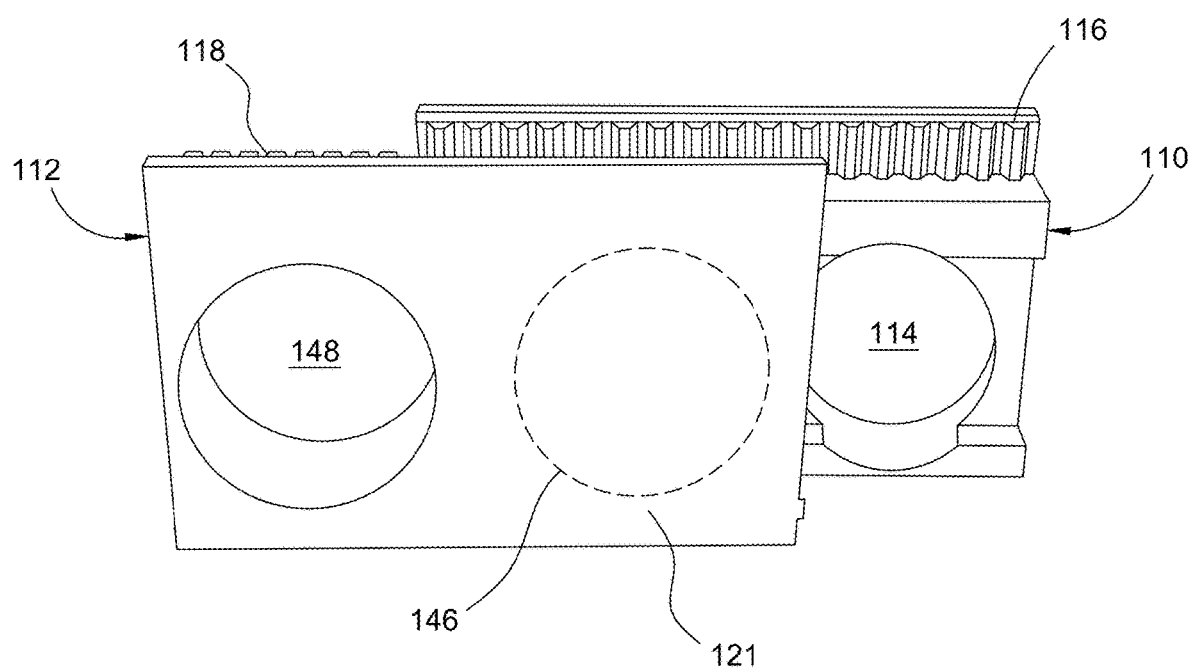
FIG. 5 is a front perspective view of the obturator plates of an eclipse valve in the closed position, as they would be in the housing, in accordance with some embodiments.
Figure 6:
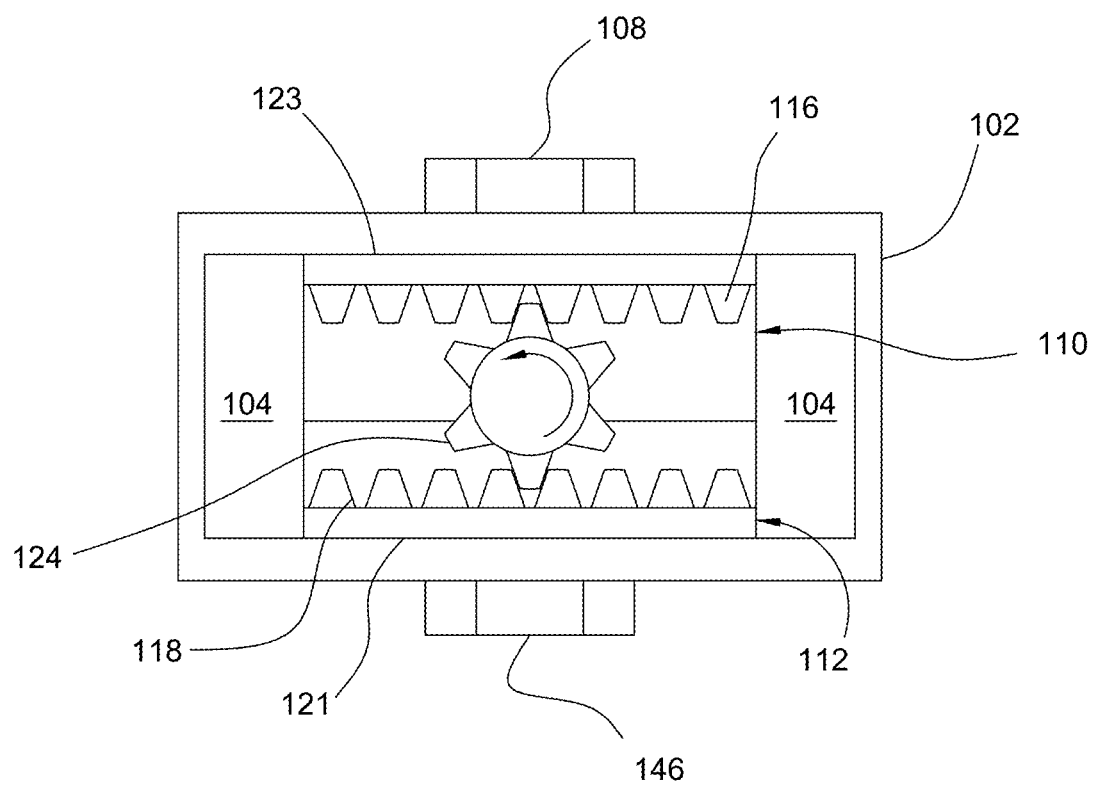
FIG. 6 is a top plan view of an eclipse valve with the cover removed showing the obturator plates in an intermediate position, in accordance with some embodiments.
Figure 7:
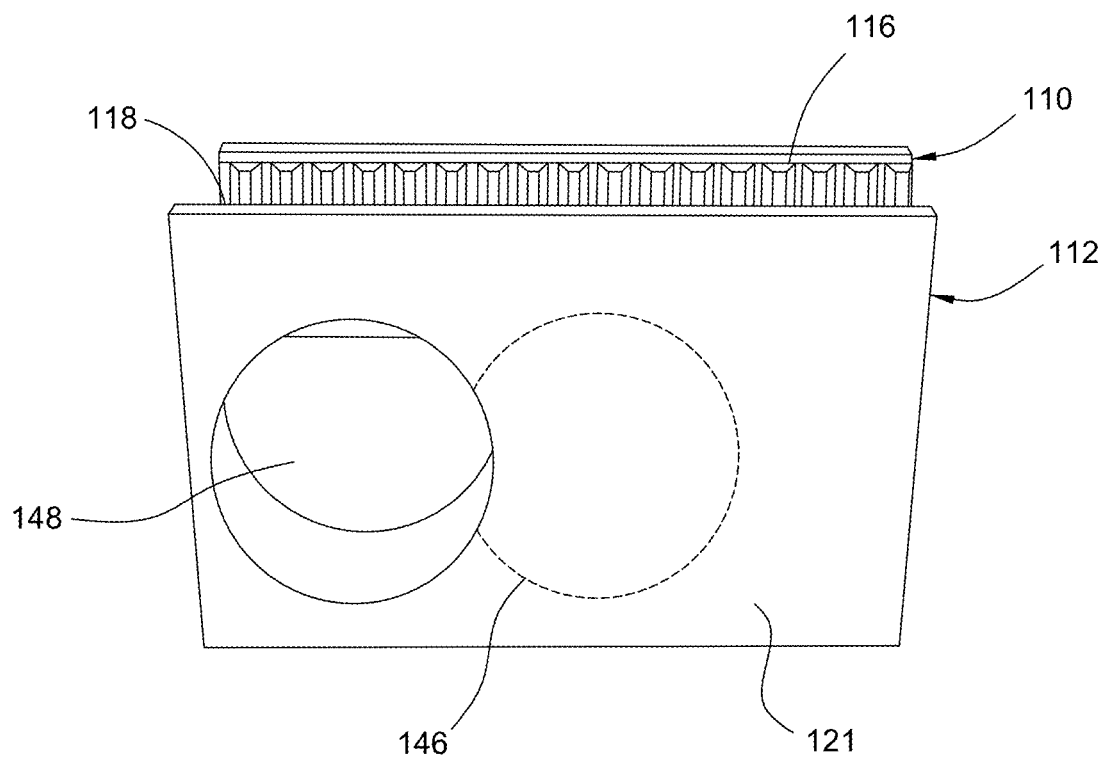
FIG. 7 is a front perspective view of the obturator plates of an eclipse valve in the intermediate position, as they would be in the housing, in accordance with some embodiments.

Similarly, each of the obturator plates 110, 112 have a respective plate openings 114, 148 (see FIG. 5). However, as seen, for example, in FIGS. 5, 7, 9, and 11, the plate openings 114, 148 through the obturator plates 110, 112 are off center on the obturator plates 110, 112. In fact, the openings 114, 148 are mostly, if not exclusively, on one half of each plate 110, 112, and do not extend across the center of the respective plate 110, 112. The openings 114, 148 can be sized to be about the same diameter/size as the openings 108, 146 through the front and back walls 107, 111. Thus, as the plates 110, 112 move within the cavity 104 in opposite directions, they can be positioned in the cavity such that their respective plate openings 114, 148 are aligned with the housing openings 108, 146 to fully open the valve 100 for flow through the valve 100. To close the valve 100, the plates 110, 112 are then moved transversely in the cavity 104 in opposing directions such that the opening 114 through the first obturator plate 110 moves in an opposite direction of the opening 148 through the second obturator plate 112, and both plates 110, 112 are moved until their respective openings 114, 148 are completely out of alignment from the wall openings 114, 146 and each other. Accordingly, when the plate openings 114, 148 are the same size as the wall openings 114, 146, the length of the cavity 114 must be at least three times the diameter of the openings 108, 114, 146, 148 to ensure that the plate openings 114, 148 can be moved completely out of alignment, and not overlap at all, with the wall openings 108, 146.

In addition to the housing 102 and obturator plates 110, 112, the valve includes a cover 106 that forms an upper boundary of the cavity 104 and seals the cavity 104. A gasket 136 can be provided around the top perimeter of the housing 102, along the tops of the front wall 107, side wall 103, back wall 111, and side wall 105. The cover 106 can be coupled to the housing using, for example, bolts 132 that pass through openings 138 and engage threaded bolt receiver bores 134. The cover 106 also has an opening 128 through the cover 106 to accommodate a drive shaft 126. The drive shaft 126 extends through the cover or shaft opening 128 and can be connected to a handle 130 for manual operation, or equivalently, a servo or motor for mechanical operation. The shaft 126 is further coupled to a drive element 124 that imparts opposing forces to each of the obturator plates 110, 112 to cause them to move within the cavity 104 in an opposing and reciprocal manner. The drive element 124 can be a gear (e.g. a pinion gear) that engages vertically oriented teeth 116, 118 on the vertical extensions of the obturator plates 110, 112 in a "rack and pinion" type arrangement. Accordingly, as the shaft 126 is rotated in one direction, the plates 110, 112 are moved to bring their plate openings 114, 148 into alignment with the wall openings 108, 146 to open the valve 100, and by turning the shaft 126 in the opposite direction, the plates 110, 112 are moved in the opposite direction such that the plate openings 114, 148 are moved in opposite directions, away from the wall openings 108, 146 and each other.

FIGS. 4-11 show a series of positions of the obturator plates 110, 112 in the housing 102, moving from full closed to fully open. FIGS. 4, 6, 8, and 10 show overhead views of the housing 102 and plates 110, 112 in the housing, and FIGS. 5, 7, 9, and 11 show side perspective views of the plates 110, 112 alone, in the position relative to each other as they appear in FIGS. 4, 6, 8, and 10, respectively.

Figure 4:
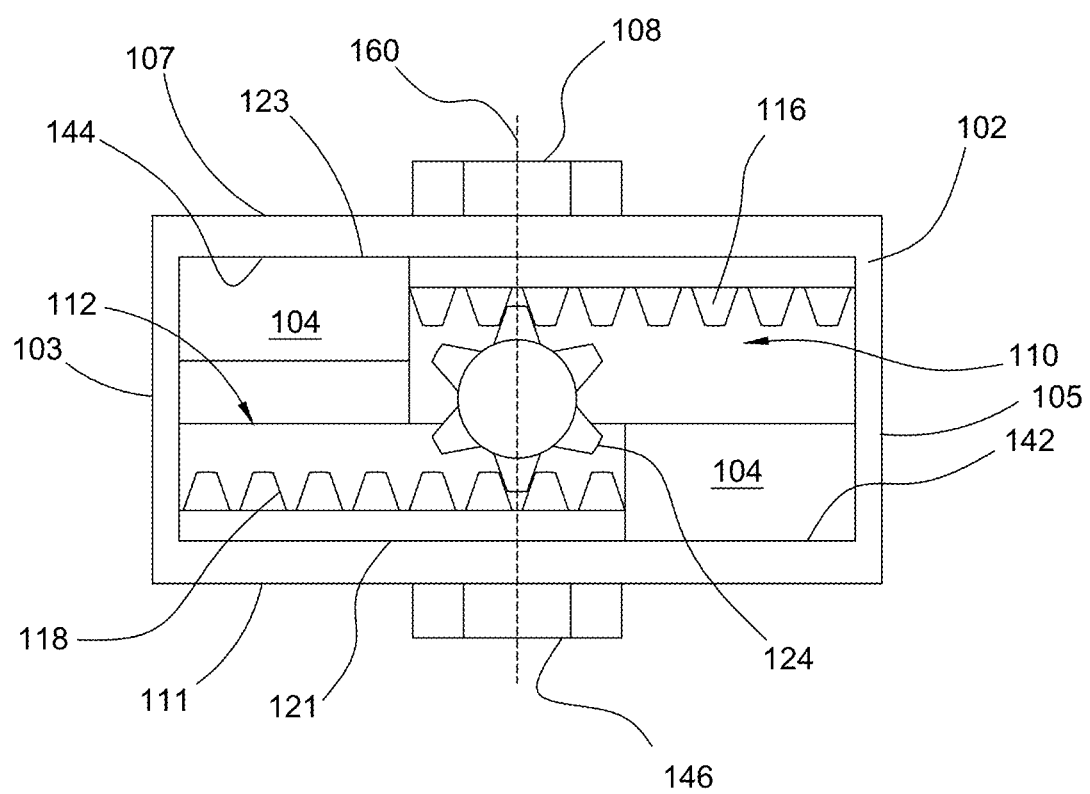
FIG. 4 is a top plan view of an eclipse valve with the cover removed showing the obturator plates in a closed position, in accordance with some embodiments.

FIG. 4 is a top plan view of an eclipse valve housing 102 with the cover removed showing the obturator plates 110, 112 in a closed position, in accordance with some embodiments. Similarly, FIG. 5 is a front perspective view of the obturator plates 110, 112 in the position shown in FIG. 4, but shown outside of the housing 102. The plates 110, 112 sit within the cavity 104 of the housing 102 in FIG. 4, as well as in FIGS. 6, 8, and 10. A drive element 124 such as a pinion gear has teeth that mesh with teeth 116, 118 on the vertical extensions of the plates 110, 112 to drive the plates 110, 112 in a reciprocal manner in the cavity 104. Obturator plate 110 bears against the inside surface 144 of the front wall 107 at interface 123, and obturator plate 112 bears against the inside surface 142 of the back wall 111 at interface 121. Further, the plates 110, 112 bear against each other as well. In FIG. 4 the plates 110, 112 are moved apart, substantially as far as they can in the cavity 104, against side walls 103, 105. In this position, as shown in FIG. 5, the plate openings 114, 148 are moved to the side of the wall openings 108, 146, with the position of wall opening 146 being projected onto plate 112 in broken line in FIG. 5. In FIGS.

Figure 8:
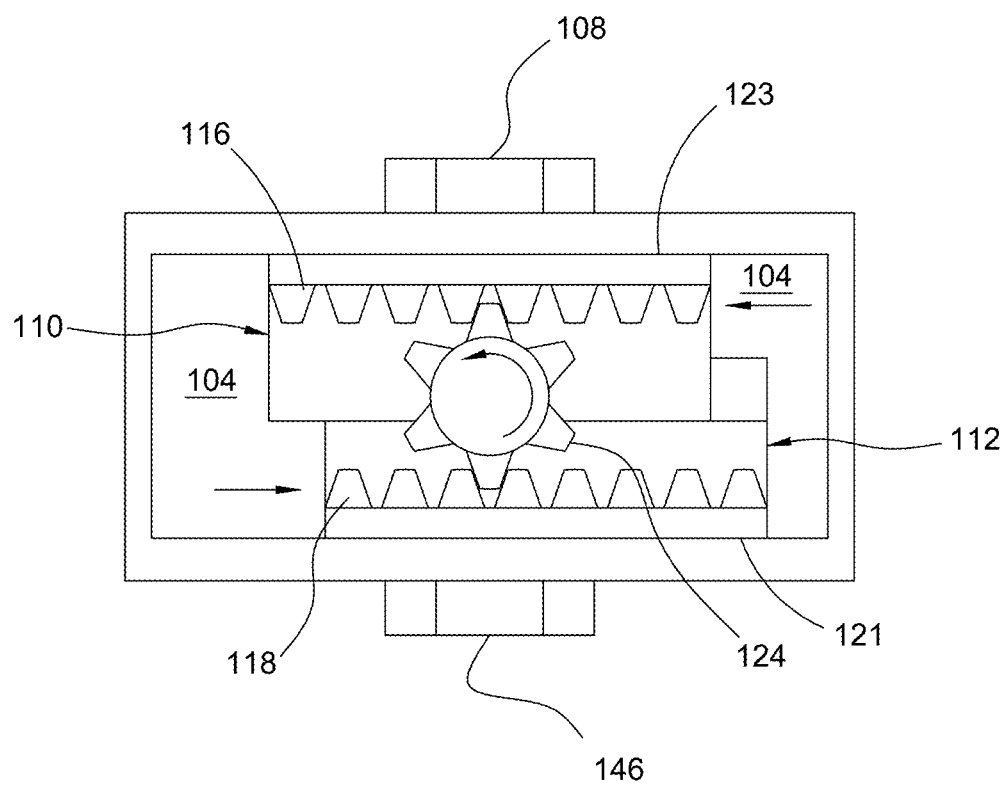
FIG. 8 is a top plan view of an eclipse valve with the cover removed showing the obturator plates in a partially open position, in accordance with some embodiments.
Figure 9:
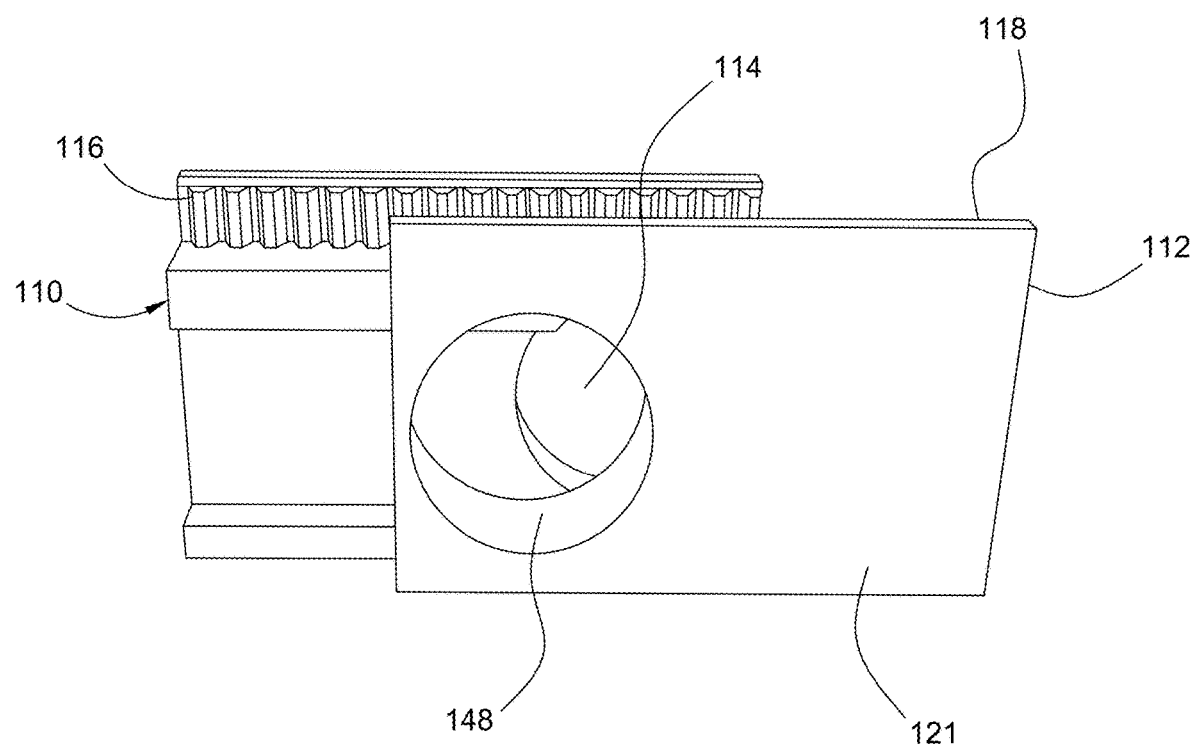
FIG. 9 is a front perspective view of the obturator plates of an eclipse valve in the partially open position, as they would be in the housing, in accordance with some embodiments.
Figure 10:
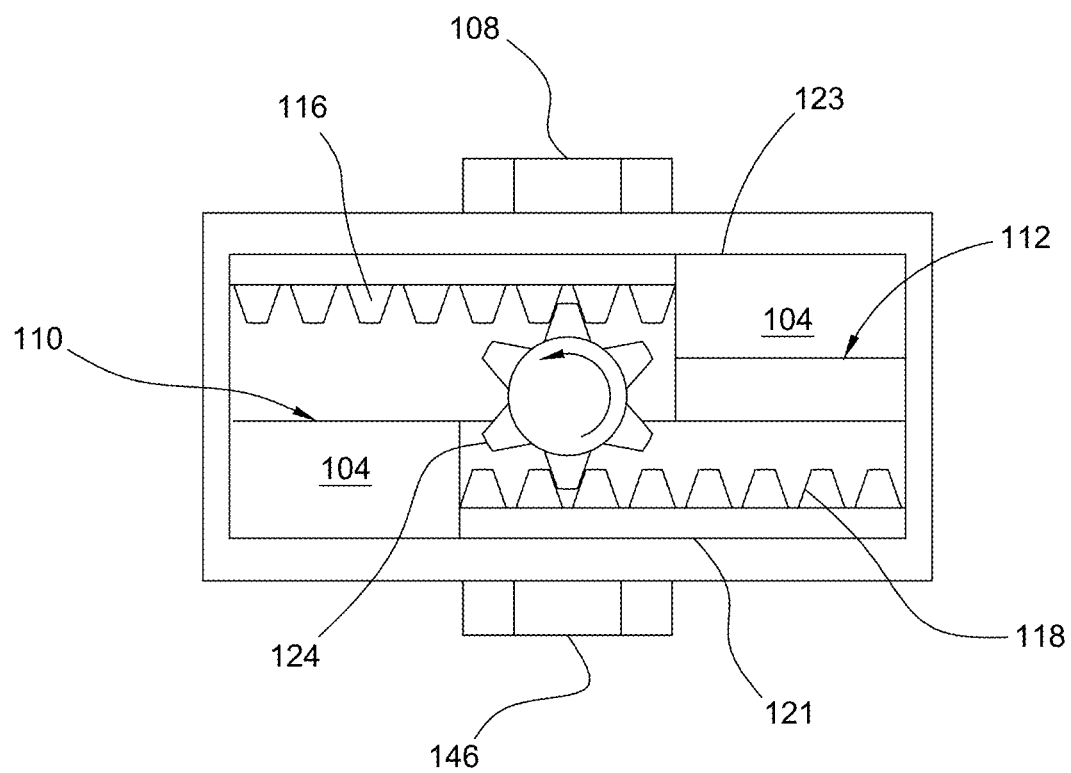
FIG. 10 is a top plan view of an eclipse valve with the cover removed showing the obturator plates in a fully open position, in accordance with some embodiments.
Figure 11:
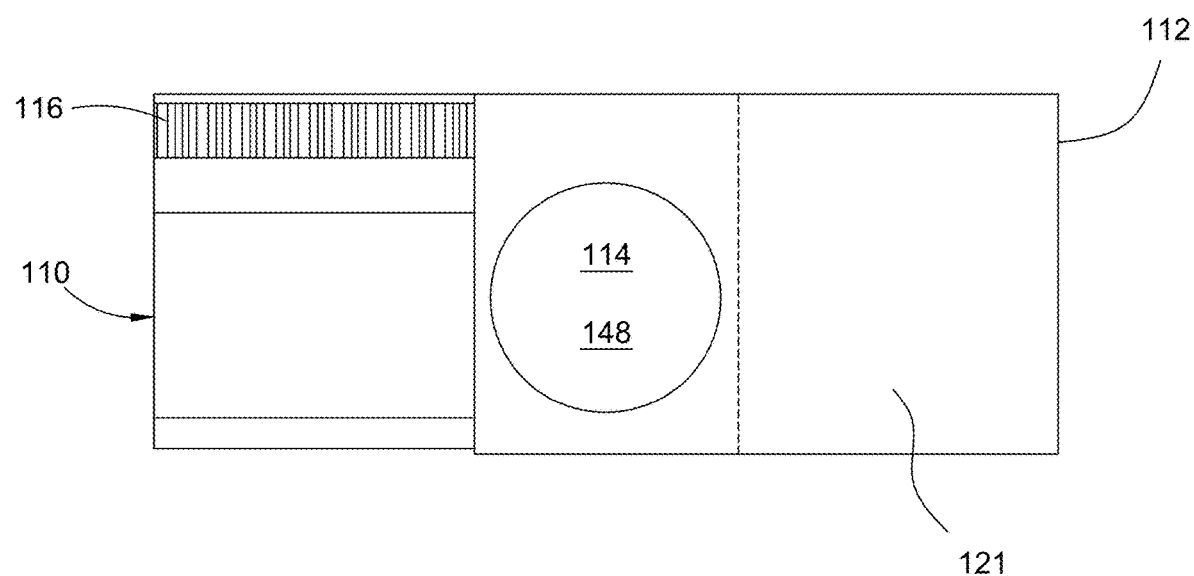
FIG. 11 is a front perspective view of the obturator plates of an eclipse valve in the fully open position, as they would be in the housing, in accordance with some embodiments.

6-7 the obturator plates 110, 112 have been moved by rotation of the drive element 124. It can be seen that the plate opening 148 of obturator plate 112 slightly overlaps with the wall opening 146 (shown in broken line here to illustrate its relative position with respect to the plates as shown in FIG. 4). However the plate openings 114, 148 are not overlapping, and as a result flow will not pass through the valve. Or to put it another way, the plates block the flow of substance through the valve 100 when the plates 110, 112 are in the positions when here. FIGS. 8-9, show a further movement of the plates 110, 112, and in FIG. 9 it can be seen that the plate openings begin to overlap in line with the wall openings 108, 146, partially opening the valve. FIGS. 10-11 show the plates 110, 112 in the fully open position, where the plate openings 114, 148 align fully with the wall openings 108, 146. To close the valve, the sequence would simply be reversed, with the drive element 124 rotating in the opposite direction.

Figure 12:
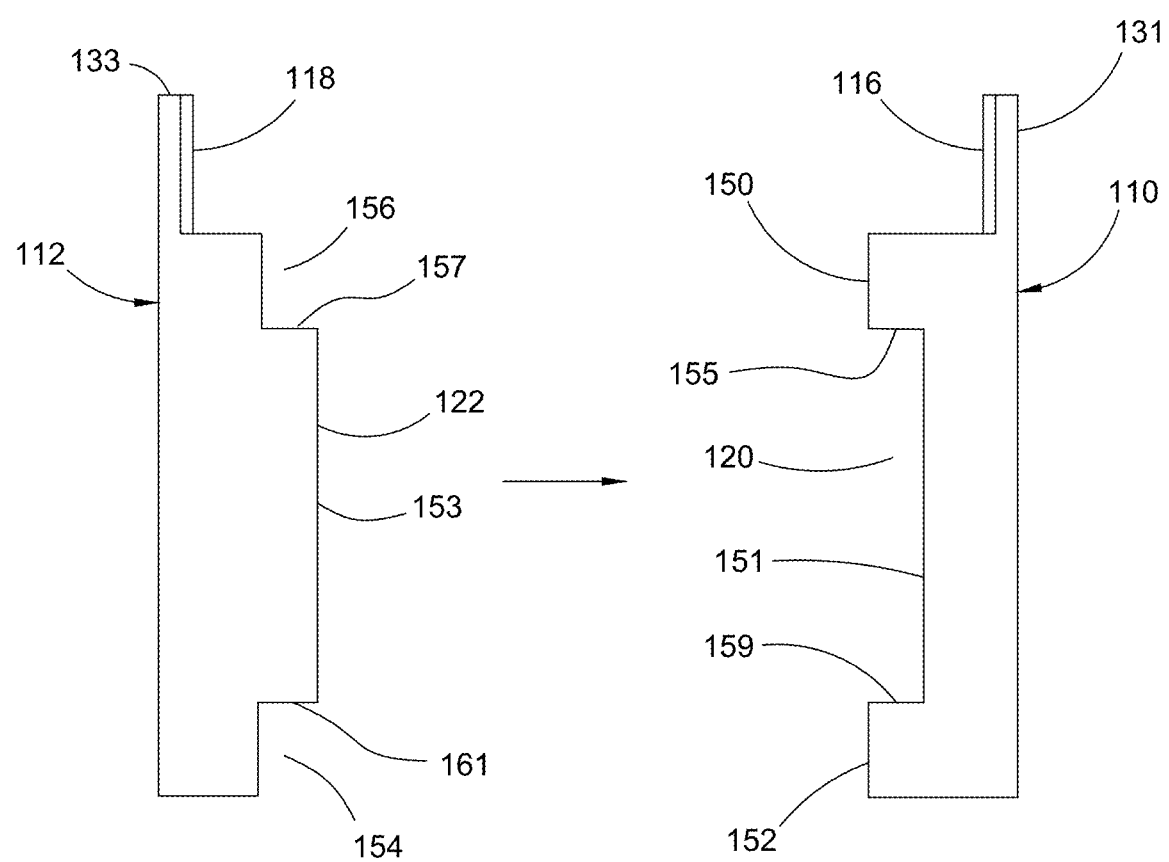
FIG. 12 is a side view of the obturator plates, separated from each other, to show anti-canting features, in accordance with some embodiments.

FIG. 12 is a side view of the obturator plates 110, 112, separated from each other, to show anti-canting features, in accordance with some embodiments. It has been found in some embodiments, depending on the specific geometry of the obturator plates and the housing, where the obturator plates interface with each other and are flat, that upon being driven to move, the torque exerted on the plates against the resistance of the plates against the housing wall results in a twist that urges the plates to tilt or cant in an opposing manner. As a result, one end of each plate urges upward, and the opposite end urges downward, which can increase resistance to moving within the housing valve housing. To counteract that effect, the plates 110, 112 can be designed with an anti-canting feature where the plates intermesh, horizontally, so that the respective torques imparted to each plate 110, 112 by the drive element cancel each other. For example, obturator plate 110 can include a groove or recess 120 that runs along the length of the plate 110, and is bounded by a top extension 150 and a bottom extension 152. The groove provides a flat vertical surface 151, and each of the extensions 150, 152 provide top and bottom surfaces 155, 159 that are orthogonal to the vertical surface 151 of the groove 120. Obturator plate 112 has corresponding "negative" features, including a horizontal extension 122 that fits into the groove 120, having an vertical surface 153 that can mate with vertical surface 151 of the groove 120. Likewise surfaces 155 and 159 mate with top and bottom surfaces 157, 161, respectively, of the horizontal extension 122. This arrangement interlocks the plates 110, 112 to prevent differential torque between the plates 110, 112 when being moved by the driving element. Further, in this view, the vertical extensions 131, 133 on which teeth 116, 118 are located can be seen at the top of each plate 110, 112 such that there is a space between the vertical extensions 131, 133 in which a driving element can fit.

Figure 13:
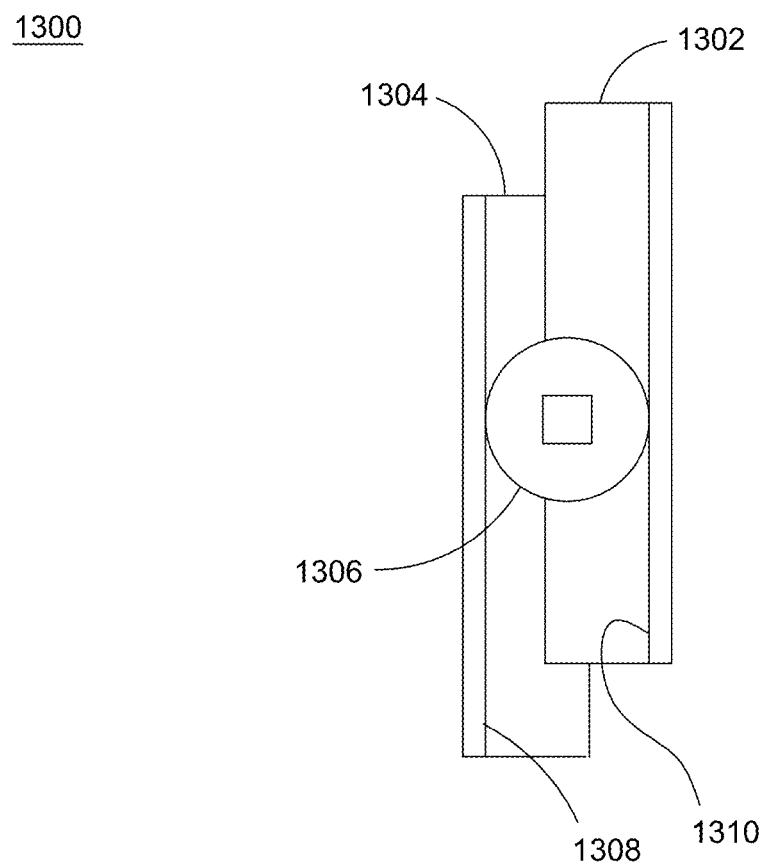
FIG. 13 show an overhead view of an obturator plate and drive arrangement, in accordance with some embodiments.

FIG. 13 shows an overhead view of an obturator plate and drive arrangement 1300, in accordance with some embodiments. Specifically, the arrangement 1300 includes a pair of obturator plates 1302, 1304 that can be placed in a housing (e.g. housing 102), and which are moved in a reciprocal manner by a drive element 1306, which engages vertical extensions 1310, 1308 of the plates 1302, 1304. Unlike the toothed/gear drive arrangement of the previously described embodiments, the arrangement 1300 uses a wheel or otherwise smooth annular drive element 1306 that can be made of, or have an outer surface layer made of a material with a high coefficient of friction on the materials of the plates 1302, 1304, such as rubber. The drive element 1306 frictionally engages the inward facing surfaces of the vertical extensions 1310, 1308, which can be smooth, or textured.

Figure 14:
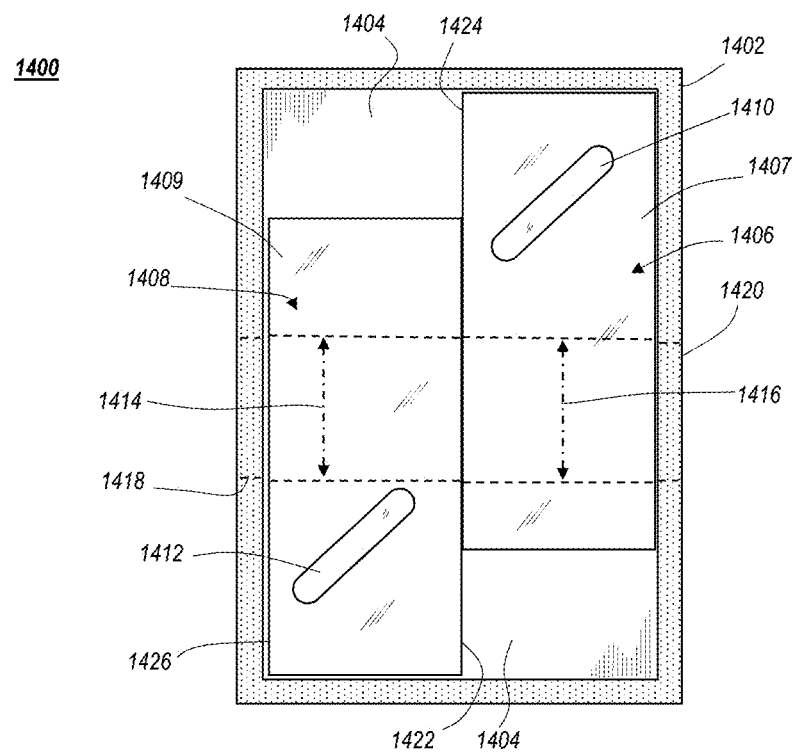
FIG. 14 shows a top plan view of an eclipse valve in which the obturator plates have diagonal slots formed in their top surface for moving the obturator plates, and wherein the obturator plates are located in the open position to allow fluid to flow through the eclipse valve, in accordance with some embodiments.
Figure 15:
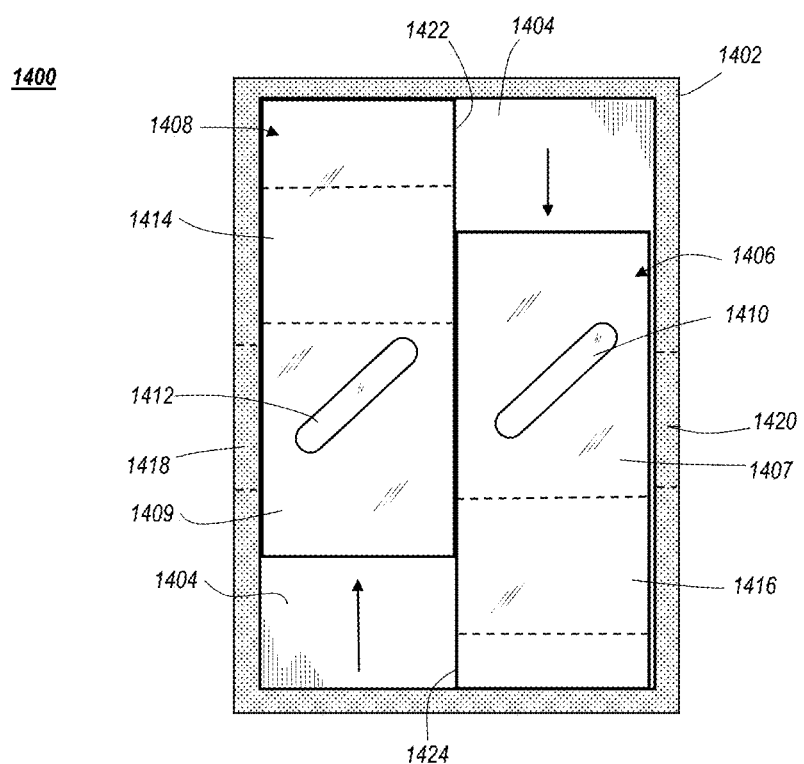
FIG. 15 shows a top plan view of an eclipse valve in which the obturator plates have diagonal slots formed in their top surface for moving the obturator plates, and wherein the obturator plates are located in the closed position to prevent fluid to flow through the eclipse valve, in accordance with some embodiments.

FIG. 14 shows a top plan view of an eclipse valve 1400 in which the obturator plates 1406, 1408 have diagonal slots 1410, 1412 formed in their top surfaces 1407, 1409, respectively, for moving the obturator plates 1406, 1408, and wherein the obturator plates 1406, 1408 are located in the open position to allow fluid to flow through the eclipse valve 1400, in accordance with some embodiments. The view shown here is similar to that of FIGS. 4, 6, 8, and 10, where the cover (e.g. 106) has been removed from the eclipse valve 1400. The obturator plates 1406, 1408 are disposed in a housing 1402 that is substantially similar to housing 102, and has a floor 1404 on which the obturator plates 1406, 1408 move/slide. Obturator plate 1406 has an opening 1416 through it having a diameter indicated by the double arrow line between the broken lines, and similarly obturator plate 1408 has an opening 1414 through it. In the position shown, the openings are aligned with each other, as well as with the openings through the housing 1418, 1420. In the position shown fluid can pass through the housing 1402 and obturator plates 1406, 1408. The plates 1406, 1408 have an interface where the front side 1424 of plate 1406 meets the back side 1422 of plate 1408. The front side 1426 of plate 1408 can be contact with the inside of the front wall of the housing 1402. The diagonal slots 1410, 1412 are recessed into the top surfaces 1407, 1409 of the plates 1406, 1408, at a substantially squared angle. That is, the side walls of the slots 1410, 1412 are at a right angle to the top surfaces 1407, 1409. The position of the plates 1406, 1408 shown here in FIG. 14 are repeated in FIGS. 17A, 17B, and 18. FIG. 15 shows a top plan view of the eclipse valve 1400 in which the obturator plates 1406, 1408 are located in the closed position to prevent fluid to flow through the eclipse valve, in accordance with some embodiments. This position is also used in FIGS. 19A, 19B, and 20. Essentially the only difference in the plates 1406, 1408 from those of FIGS. 1, 4, 6, 8, 10 are that there are no vertical extensions to drive the plates. Rather, a driver engages the diagonal slots 1410, 1412 to move the plates 1406, 1408.

Figure 16A:
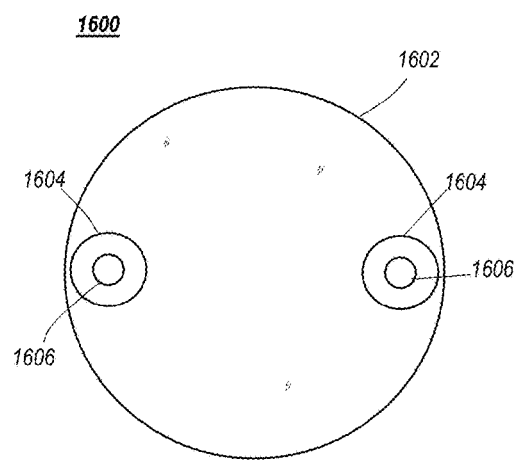
FIG. 16A is a bottom view of a driver for driving the obturator plates of FIGS. 14-15 to their different positions for operating the eclipse valve, in accordance with some embodiments.
Figure 16B:
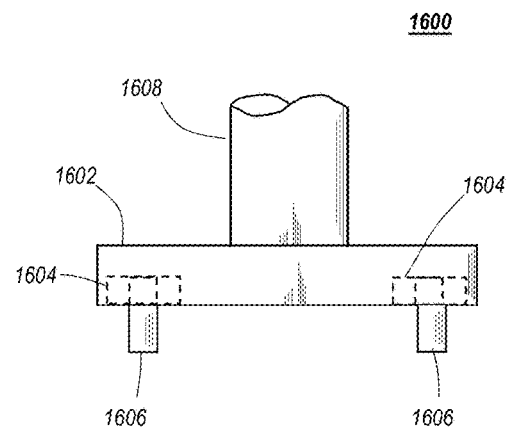
FIG. 16B is a side view of the driver of FIG. 16A.

FIG. 16A is a bottom view of a driver 1600 for driving the obturator plates 1406, 1408 of FIGS. 14-15 to their different positions for operating the eclipse valve 1400, in accordance with some embodiments, and FIG. 16B is a side view of the driver 1600. The driver 1600 includes a driver body 1602 that is disposed in the housing between the top surfaces 1407, 1409 of the plates 1406, 1408 and the inner or bottom of the cover (not shown). Mounted in the bottom of the driver body 1602 are a pair of bearing assemblies 1604 on opposing positions on the bottom of the driver body 1602 relative to the center. The bearing assemblies each support and hold a peg 1606 that extends downward from the bottom of the driver body 1602. Each of these pegs 1606 are disposed on one of the diagonal slots 1410, 1412 when the valve 1400 is assembled. A shaft 1608 is coupled to the driver body 1602 at a top side of the driver body 1602 and is used to turn the driver body 1602.

Figure 17A:
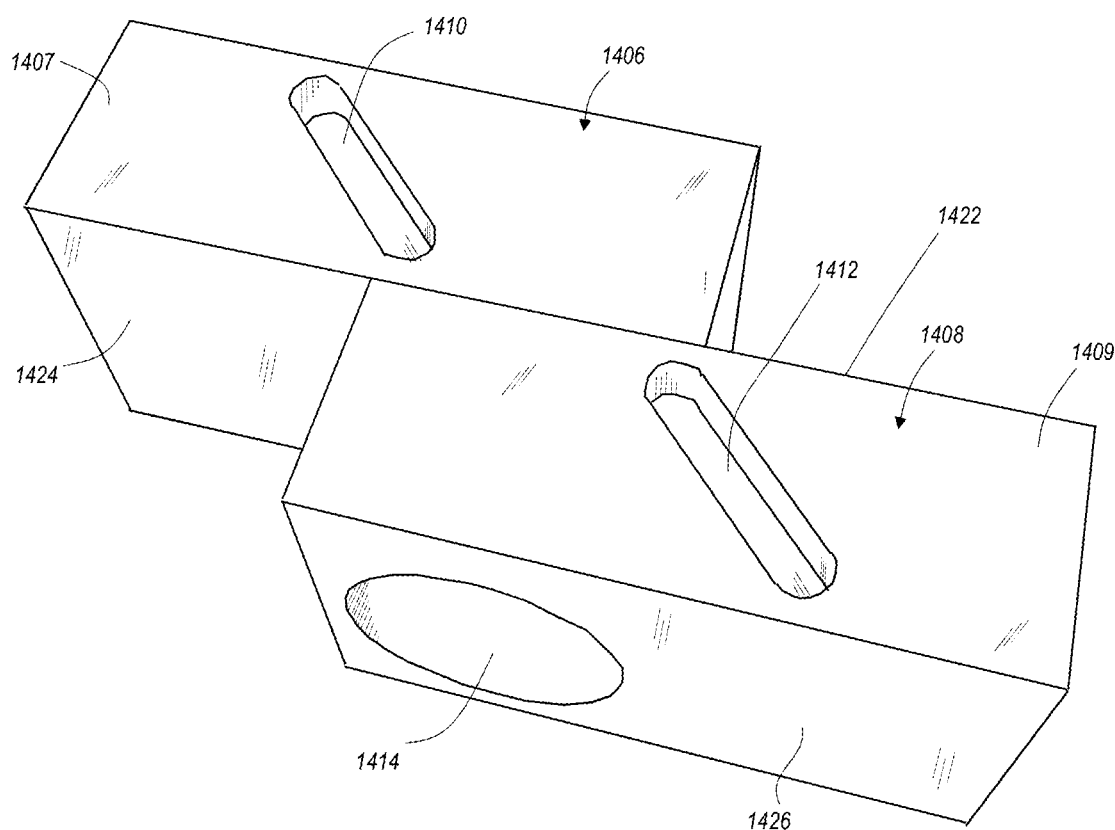
FIG. 17A shows a top-side perspective view of the obturator plates, without the housing of the eclipse valve, in the open position as shown in FIG. 14.
Figure 17B:
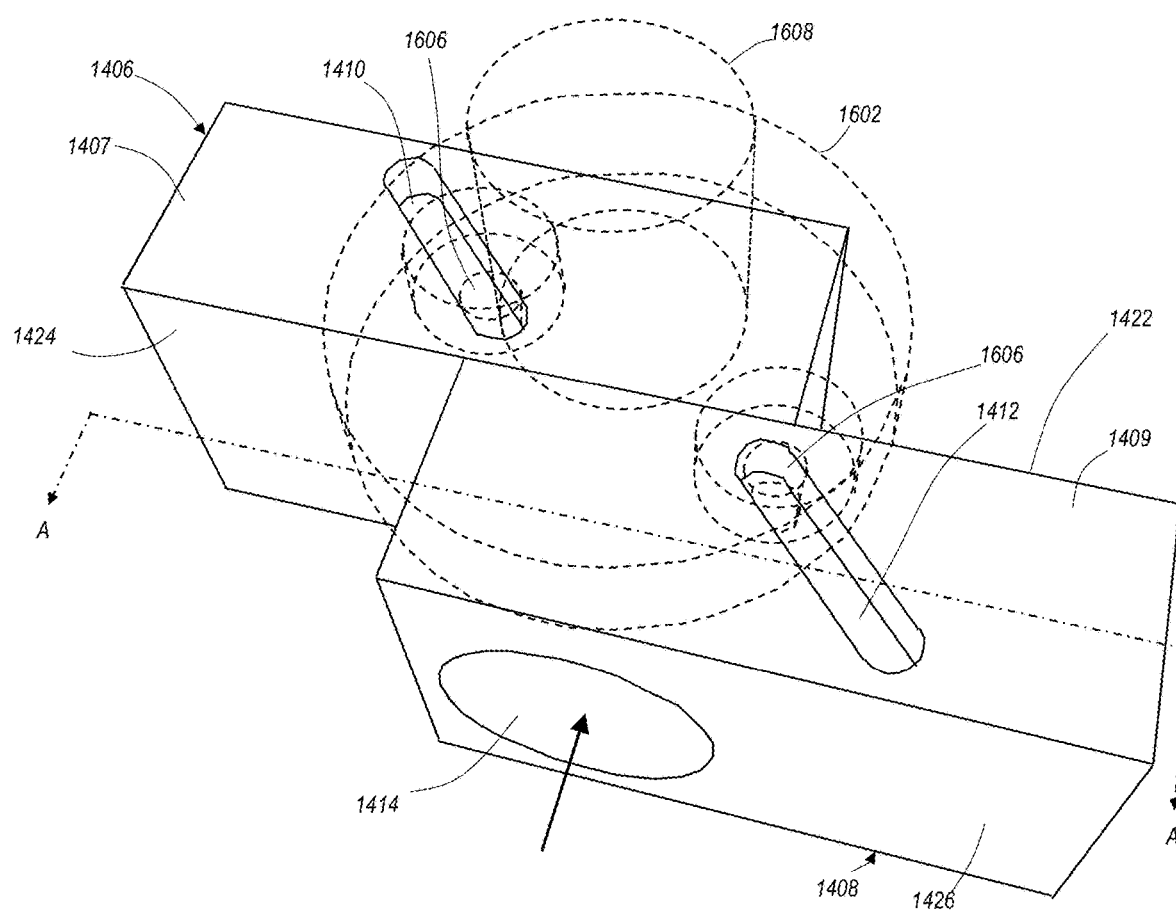
FIG. 17B shows a top-side perspective view of the obturator plates, without the housing of the eclipse valve, and with the driver shown in phantom over the obturator plates, in the open position as shown in FIG. 14.
Figure 18:
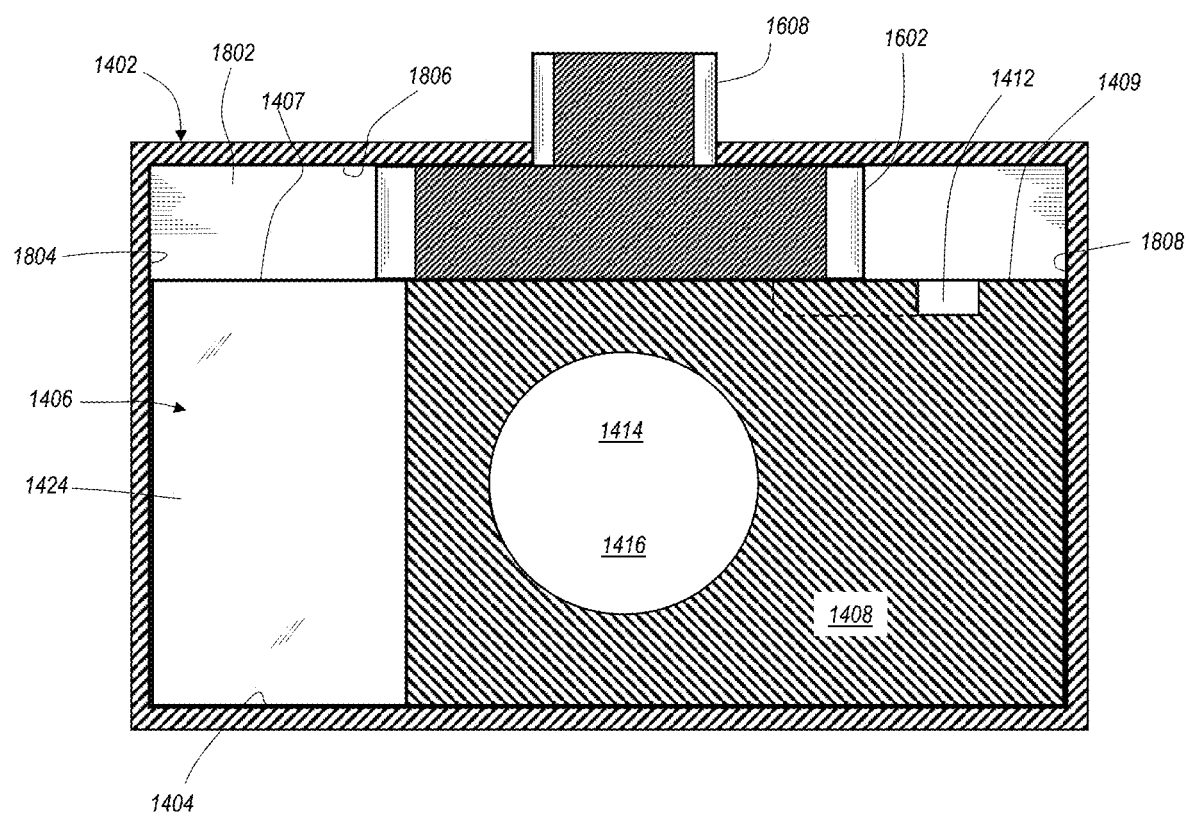
FIG. 18 shows a side cut-away view taken along the section line shown in FIG. 17B of the eclipse valve, including the housing.
Figure 20:
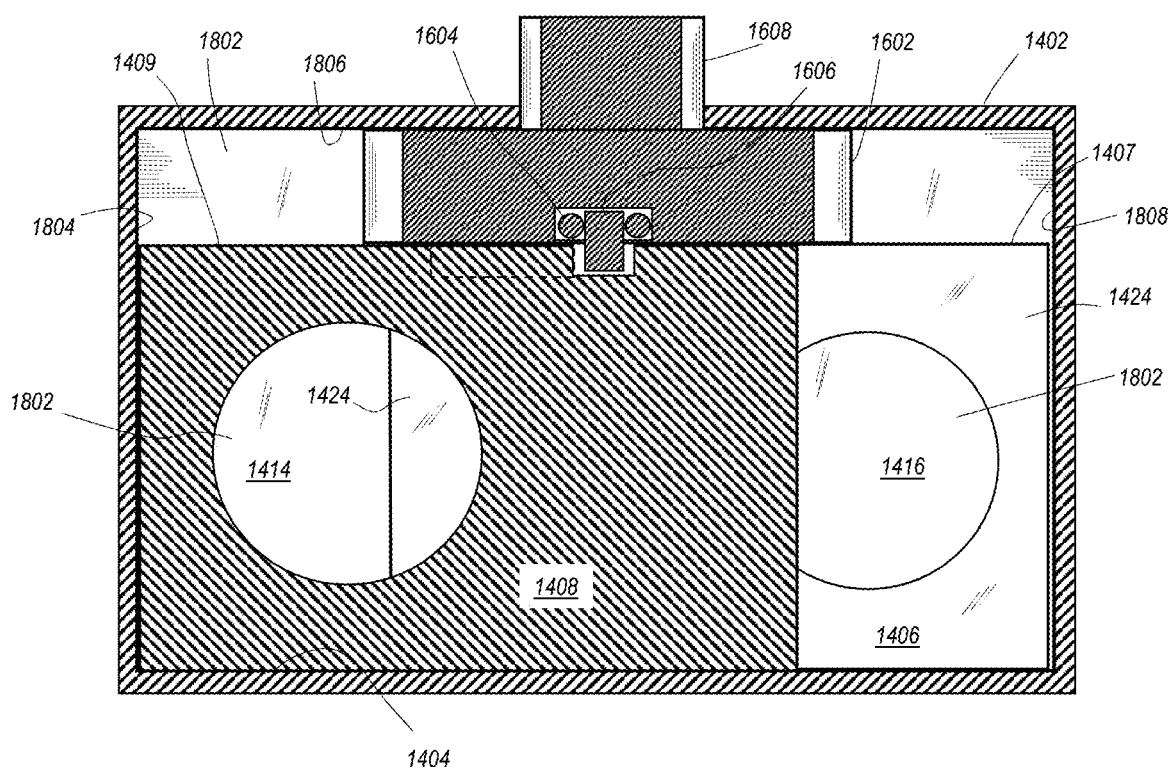
FIG. 20 shows a side cut-away view taken along the section line shown in FIG. 19B of the eclipse valve, including the housing.

FIG. 17A shows a top-side perspective view of the obturator plates, without the housing of the eclipse valve, in the open position as shown in FIG. 14, and FIG. 17B shows a top-side perspective view of the obturator plates, without the housing of the eclipse valve, and with the driver shown in phantom over the obturator plates, in the open position as shown in FIG. 14. In FIG. 17B the pegs 1606 are each disposed in one of the diagonal slots 1410, 1412 of a respective plate 1406, 1408. The diagonal slots 1410, 1412 can be, for example, at substantially a forty five degree angle to the direction of motion of the plates (e.g. the arrows shown in FIG. 15). As the shaft 1608 is turned, the driver body 1602 is in turn also turned, moving the plates in opposite, reciprocating directions in the housing 1402. The pegs 1606 turn in the bearing assemblies 1604 as they move in the slots 1410, 1412. That is the pegs 1606 rotate in the bearing assemblies 1604, and in the opposite direction that the driver body 1602 is rotated. If the driver body 1602 is rotated clockwise, the pegs 1606 will rotate counter-clockwise as they press against the wall of the diagonal slots 1410, 1412, and vice-versa. In the position shown in FIGS. 17A-B, and FIG. 18, fluid can pass through the openings 1414, 1416 through the plates 1406, 1408, as indicated by the arrow into opening 1414 in FIG. 17B. FIG. 18 shows a cross section or cut-away view taken longitudinally through the valve assembly along the section line A-A of FIG. 17B. In FIG. 18 portions of the housing 1402 are also shown, including the inner surfaces of the back wall 1802, a first side wall 1804, the cover 1806, and a second side wall 1808. Further, as can be seen in FIGS. 18 and 20, the driver body 1602 has a height or thickness that substantially spans the distance from the top surfaces 1407, 1409 of the plates 1406, 1408 to the inner surface 1806 of the cover. This can prevent any tendency of the plates 1406, 1408 to lift at one end or the other due to the torque being applied through the pegs 1606 to the plates 1406, 1408 while turning the driver body 1602. Alternatively, the arrangement of FIG. 12 can be used, where a portion of one plate extends into a corresponding recess in the other plate.

Figure 19A:
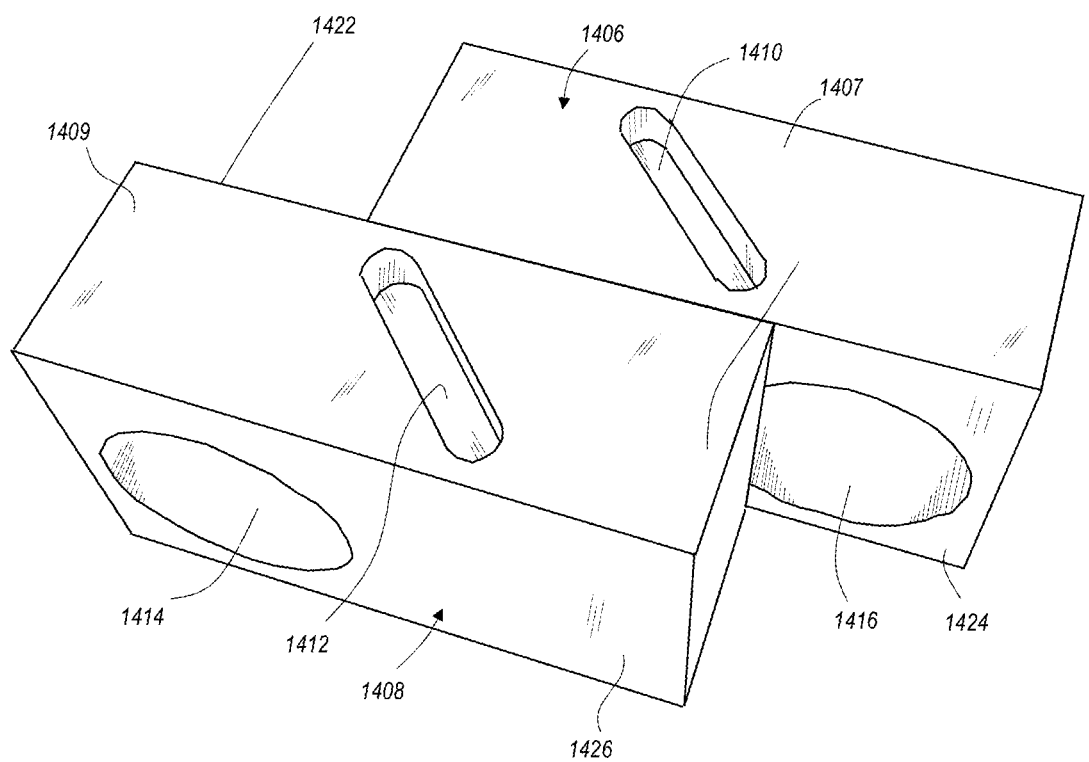
FIG. 19A shows a top-side perspective view of the obturator plates, without the housing of the eclipse valve, in the closed position as shown in FIG. 15.
Figure 19B:
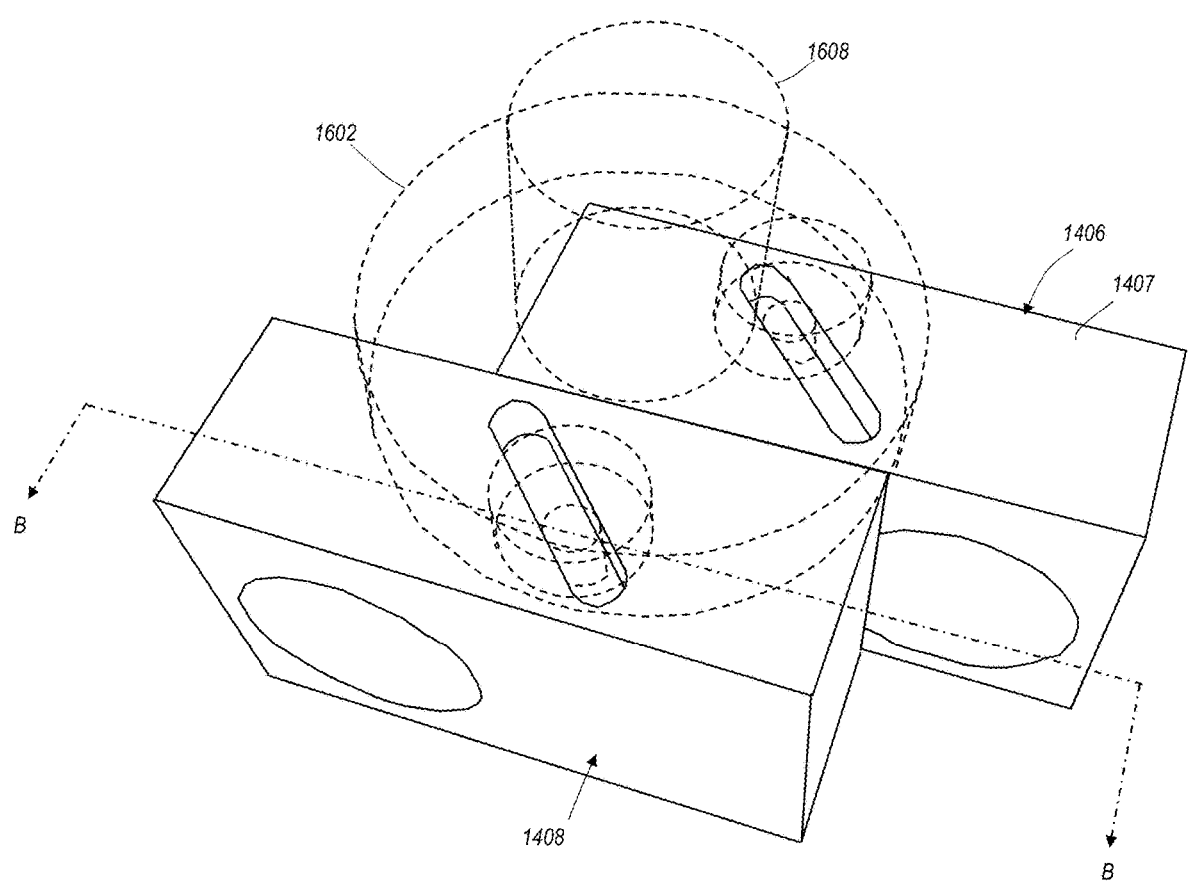
FIG. 19B shows a top-side perspective view of the obturator plates, without the housing of the eclipse valve, and with the driver shown in phantom over the obturator plates, in the open position as shown in FIG. 15.

To close the eclipse valve 1400, the shaft 1608 is turned, thereby imparting force to the plates 1406, 1408 through the pegs 1606 engaged in the diagonal slots 1410, 1412 on the top surfaces 1407, 1409 of the plates 1406, 1408. The closed position is shown in FIGS. 19A-B, and FIG. 20. The pegs 1606 are fixed in the driver body on opposing portions of the driver body, even though the perspective view here may suggest differently. FIG. 20 shows a side cut-away view taken along the section line B-B shown in FIG. 19B of the eclipse valve 1400, including the housing 1402. Here it can be seen that the opening 1414, 1416 are fully misaligned from each other, preventing fluid from passing through the valve 1400. It can be seen that, between FIGS. 18 and 20, the plates 1406, 1408 move from one side of the housing to the other between the full open and full closed positions. Thus, in FIG. 18, plate 1408 is against the second side wall 1808 and plate 1406 is against the first sidewall 1804. In FIG. 20, the opposite occurs, and plate 1408 is against the first sidewall 1804 and the plate 1406 is against the second sidewall 1808.

Figure 21:
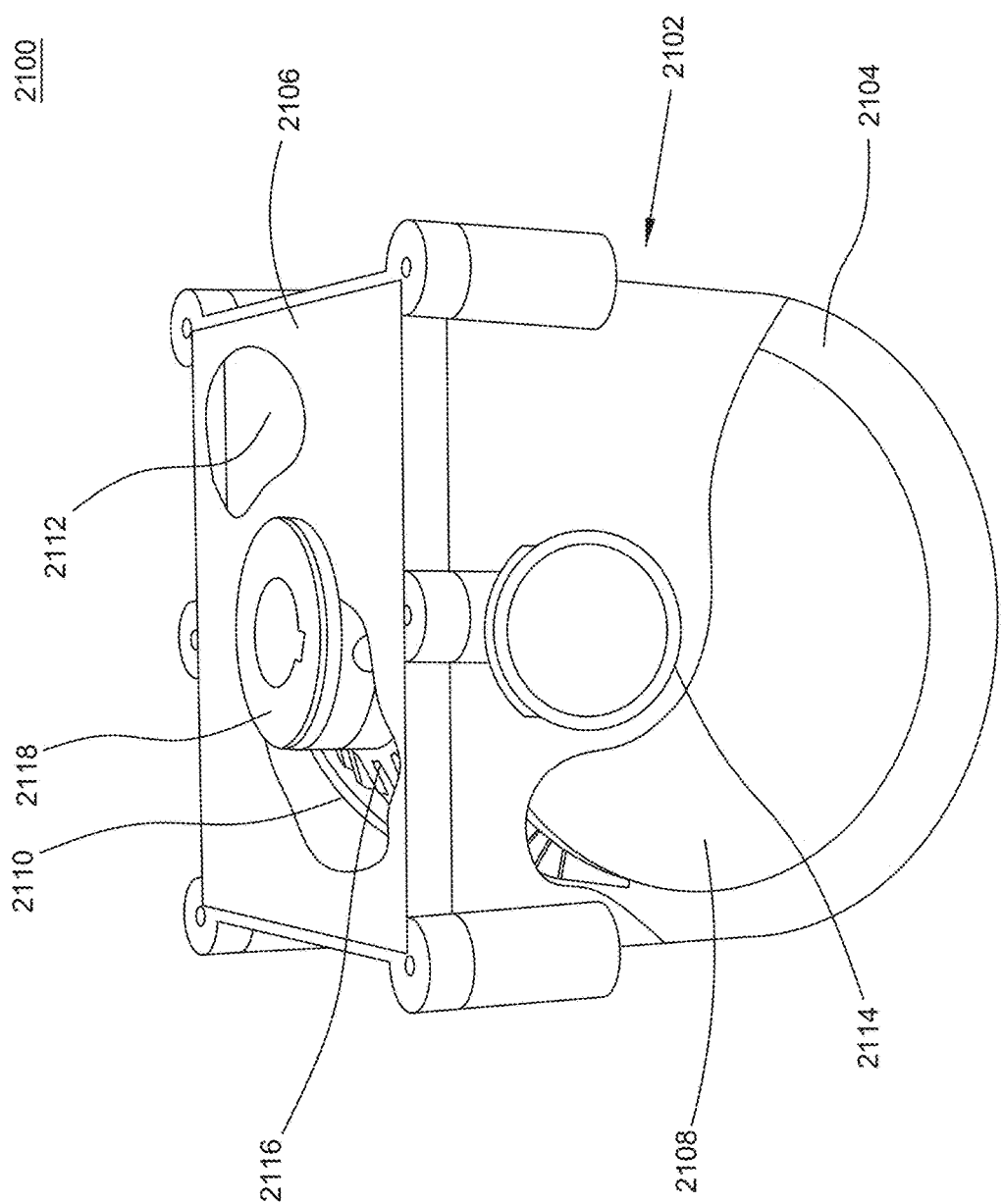
FIG. 21 shows a top-front perspective view of an eclipse valve using circular obturator plates in a valve housing, with the housing being shown in transparent, in accordance with some embodiments.
Figure 22:
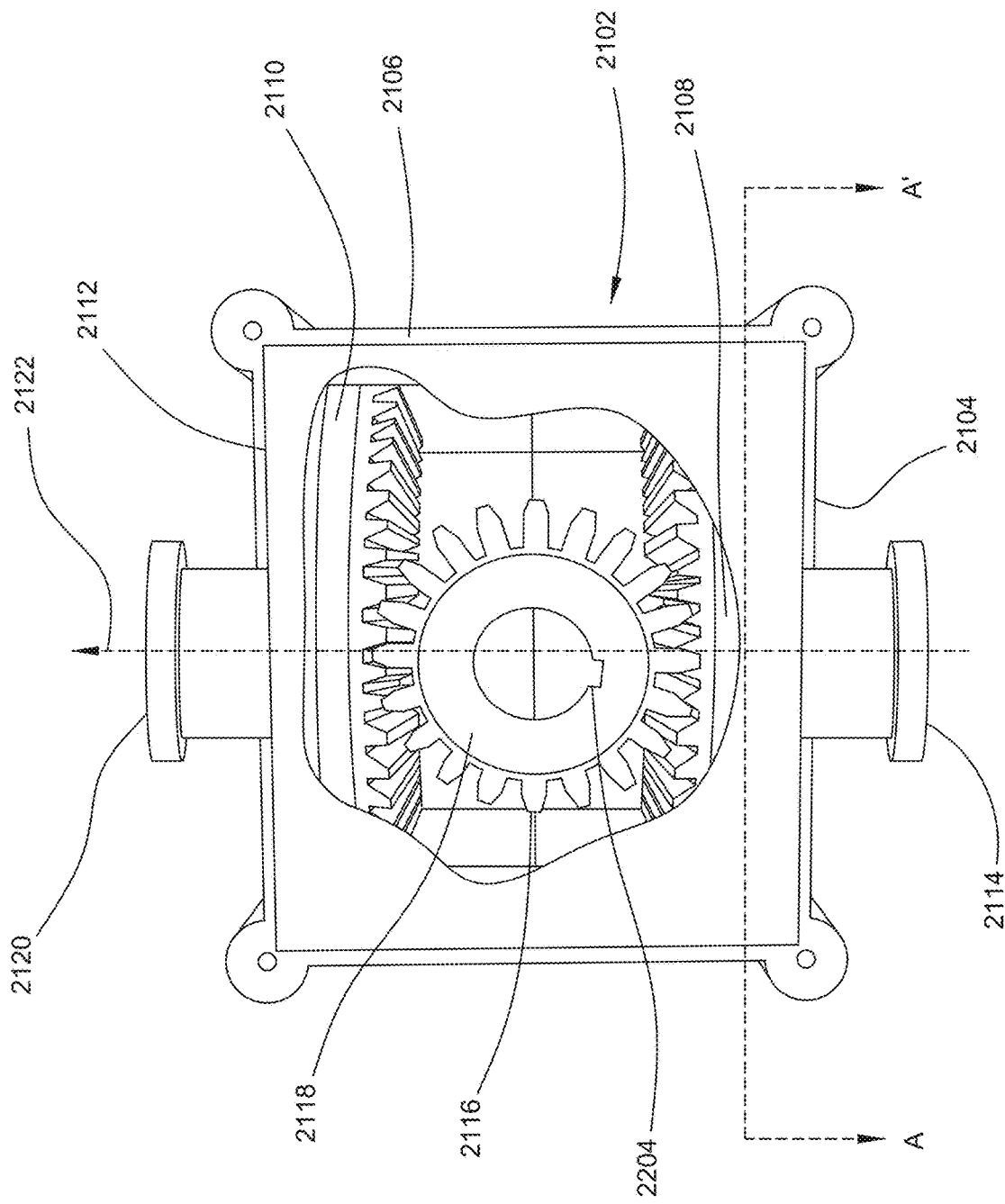
FIG. 22 shows a top perspective view of the eclipse valve using circular obturator plates as shown in FIG. 21.
Figure 23:
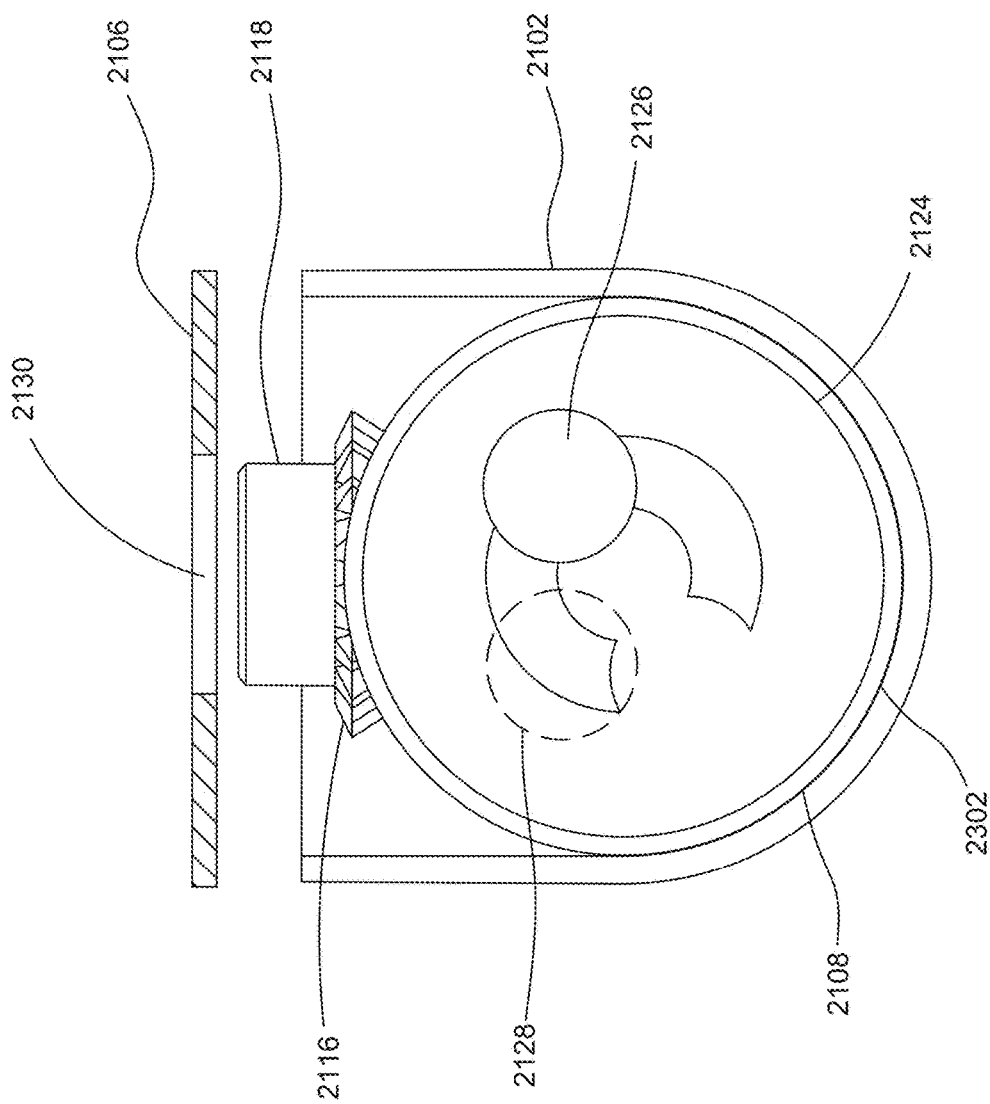
FIG. 23 a front elevational view of an eclipse valve in which the housing has been sectioned along line A-A' of FIG. 22, which the obturator plates in a closed configuration.

FIG. 21 shows a top-front perspective view of an eclipse valve 2100 using circular obturator plates in a valve housing, with the housing being shown in transparent, in accordance with some embodiments. FIG. 22 shows the same valve from a top perspective view, and FIG. 23 shows the same valve 2100 from the front in a sectioned view with the section taken along line A-A' of FIG. 22. The obturator plates used in the present embodiments rotate about a central axis in a circular direction and in opposite directions. The eclipse valve 2100 includes a lower housing 2102 and a cover 2106. The lower housing 2102 has walls that define an internal cavity, including a front wall 2104 and a back wall 2112. The front wall 2104 has an inner side (inside the cavity of the lower housing 2102) that generally bears against an outward facing surface or first side of the first obturator plate 2108. Likewise, the back wall 2112 includes an inner surface that generally bears against the outward facing surface or first side of the second obturator plate 2110 when both the first and second obturator plates are placed into the cavity for operation. Further, both the first and second obturator plates 2108, 2110 have opposing surfaces that bear against each other. The lower housing further includes a front fitment 2114 at the front wall 2104 and a rear fitment (not shown here) on the back wall. The fitments allow fluid lines to connect to the eclipse valve 2100 and define an axis of flow 2122 through the eclipse valve 2100.

Figure 25A:
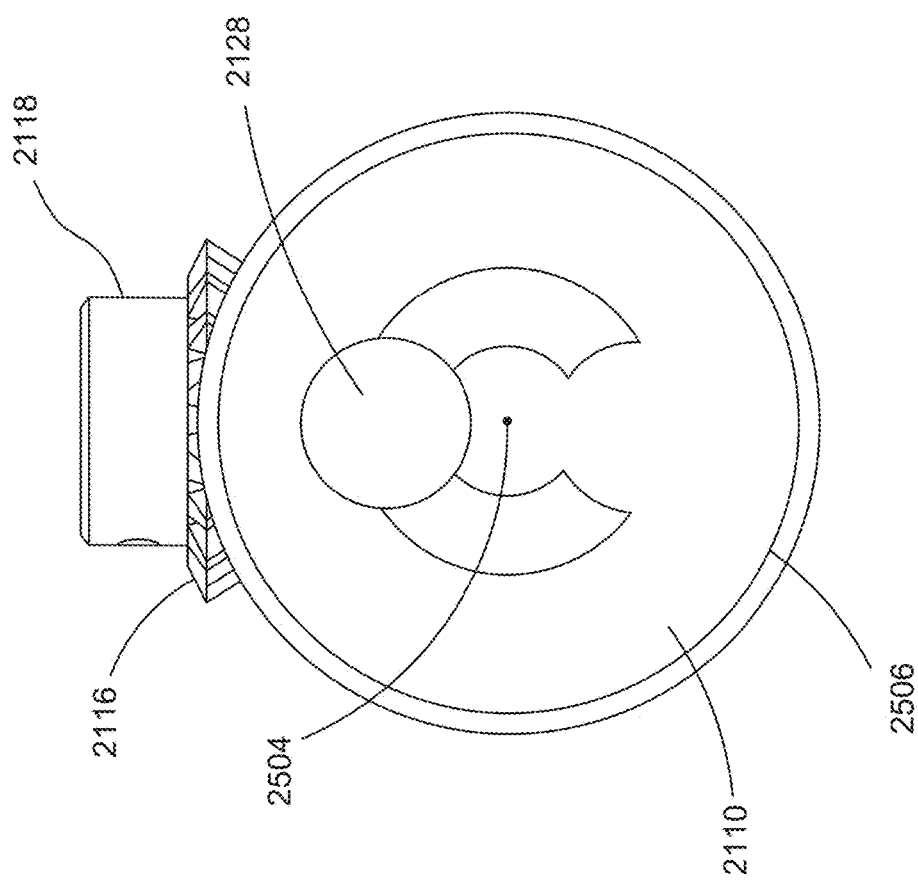
FIGS. 25A and 25B show a front elevational view and a rear elevational view, respectively, of the circular obturator plates in the open position.

The obturator plates, as shown in FIG. 23, each have openings through them, in a direction from front to back. The first obturator plate 2108 has an opening 2126, and the second obturator plate, here located directly behind the first obturator plate 2108, has an opening 2128. The valve is closed when these openings 2126, 2128 are non-aligned, meaning completely non-overlapping, in the direction of flow 2122 as shown here, and are open when the openings 2126, 2128 are aligned, as in FIGS. 25A, 25B.

Figure 24:
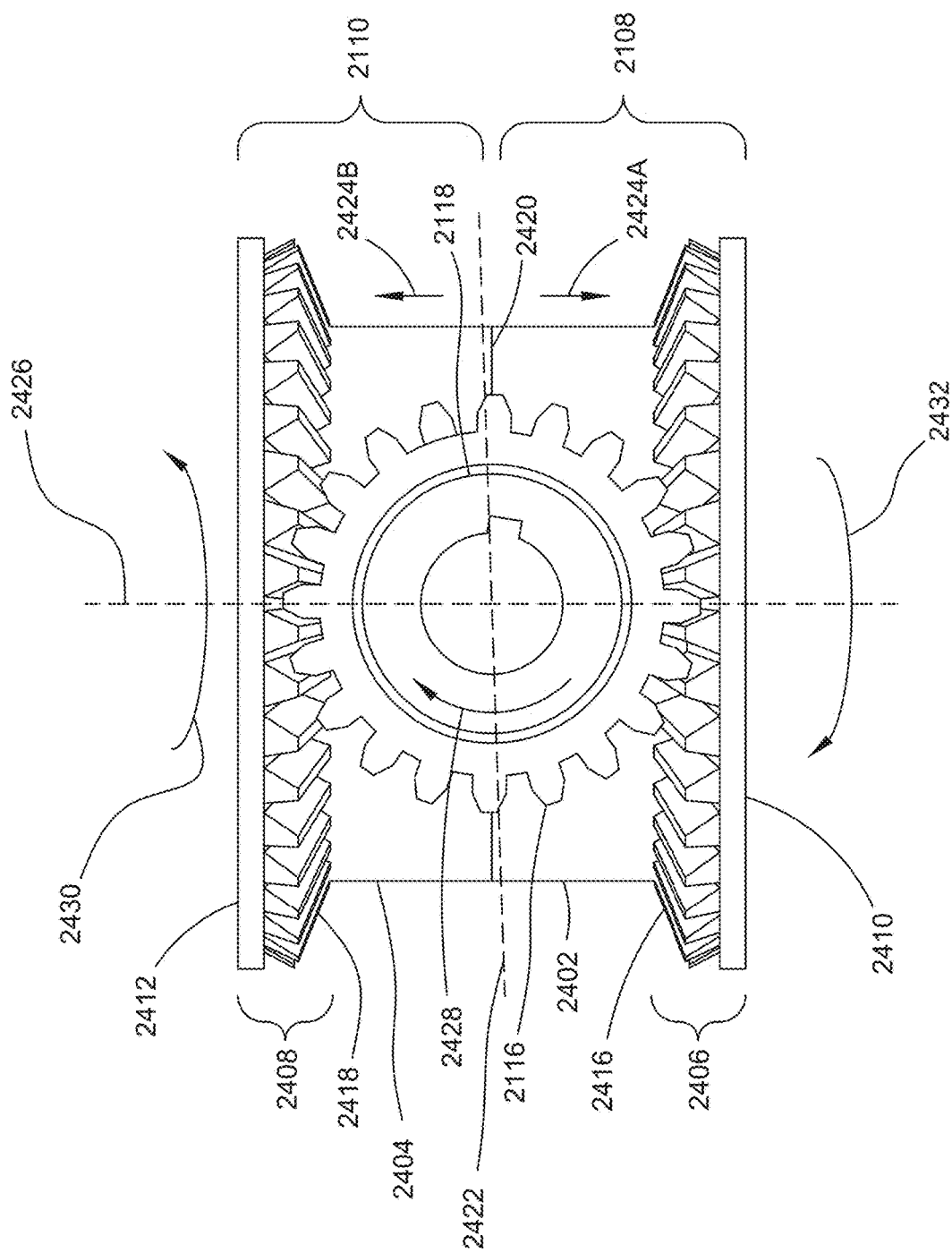
FIG. 24 is a top plan view of the circular obturator plates and pinion drive gear, without the housing.

In FIG. 24, the first and second obturator plates 2108, 2110 are shown as they would be arranged inside the lower valve housing 2104. The first obturator plate 2108 has a main portion 2402, and the second obturator plate 2110 has a main portion 2404. The openings 2126, 2128 pass through the main portions 2402, 2406 in the direction of axis 2426. At the front of the first obturator plate 2108, and at the back of the second obturator plate 2110, are respective drive extensions 2406, 2408 that extend outward, radially, from the main portions 2402, 2404. The extensions 2406, 2408 can also meet the front and back surfaces 2410, 2412 of the first and second obturator plates 2108, 2110, respectively. These surfaces 2410, 2412 substantially bear against the front and rear wall 2104, 2112, respectively, of the lower housing 2102. As will be appreciated, at the tops of the plates 2108, 2110, the extensions 2406, 2408 extend upwards to engage the horizontally oriented drive gear 2116. The extensions are configured to engage a drive element such as a drive gear 2116 that has teeth on the outside of the gear 2116 that are at an angle relative to vertical, and specifically, the top of the teeth extend outward, horizontally, farther than the bottom of the teeth. Likewise, the extensions 2406, 2408 have corresponding teeth 2416, 2418, respectively, that are arranged in an arc around the center axes 2502, 2504 (see FIGS. 25A, 25B) of the respective obturator plates and are configured to mesh with the teeth of the drive gear 2116 and are oriented at a complementary angle to the teeth of the drive gear 2116. Thus the plates 2108, 2110 are driven to turn in opposite directions by the drive gear 2116 being rotated, such as by shaft 2118 that can include a keyed opening 2204 into a which a keyed shaft (not shown) can be placed to turn the drive gear 2116. The plates 2108, 2110 are caused by the rotation of the gear 2116 to rotate about their central axis 2426, which is substantially parallel to the flow axis 2122. Thus, for example, when the gear 2116 is turned in the direction of arrow 2428, the first obturator plate will rotate in the direction of arrow 2432, and the second obturator plate will rotate in the opposite direction as indicated by arrow 2430. Rotating the plates will bring their respective openings 2126, 2128 either out of alignment (closed or non-aligned), into alignment (open), or partially into alignment (partially open) and turning the drive gear 2116 can be done until the valve is open or closed to the desired degree, either completely open, completely closed, or at some partially opened position, as desired. In addition to turning the obturator plates 2108, 2110, the drive gear 2116 can also hold the obturator plates 2108, 2110 in place in the lower housing 2102. Thus some force can be exerted through the angled teeth of the drive gear 2116 into the extensions 2406, 2408.

Figure 25B:
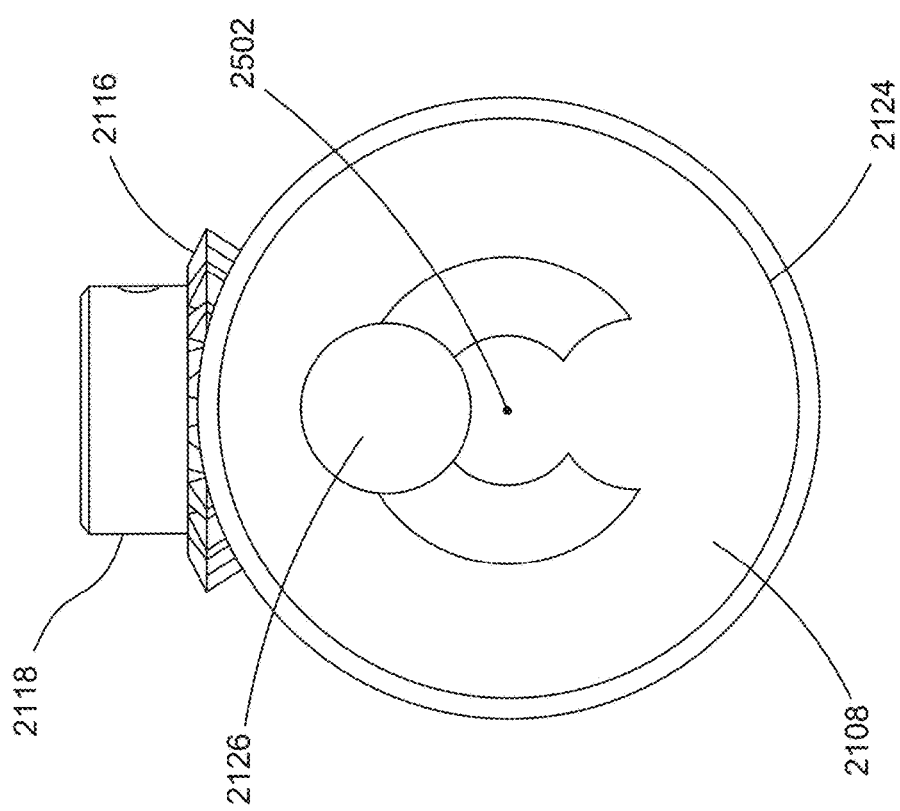

In some embodiments the interfacing surfaces 2410, 2412 can include an O-ring 2124, 2506 (see FIG. 25B). The O-rings 2124, 2506 help seal the plates 2108, 2110 against the respective housing walls. In general, the O-rings each define a boundary, and the openings 2126, 2128 are entirely within the boundary of each O-ring 2124, 2506. Accordingly, the O-rings 2124, 2506 completely encircle the openings through the walls of the housing 2102 as well, in all positions of the obturator plates 2108, 2110. To further assist with sealing, when the obturator plates 2108, 2110 are in the closed position, as shown in FIG. 24 there is a slight bevel 2422 at the interface 2420 between the plates 2108, 2110. The bevel line 2422 indicates that the interface 2420 changes angle as the plates 2108, 2110 are rotated from the open to the closed position. A one degree of bevel is sufficient to urge the two plates 2108, 2110 outward, against the front and rear walls 2104, 2112 of the housing, respectively to help further seal the valve plates 2108, 2110 against the front and rear walls when the valve is closed.

An eclipse valve has been disclosed that addresses the problems associated with prior art valves. The inventive eclipse valve eliminates the need for a "block and bleed" valve arrangement, it can be easily serviced while remaining in-line in a flow system, and it eliminates the need for complex mechanical arrangements like shutter valves. There are essentially only three moving parts; the two obturator plates and the driving element. The surface engagement between the obturator plates and the housing, and with each other, provide excellent sealing, while still allowing ease of movement.

The claims appended hereto are meant to cover all modifications and changes within the scope and spirit of the present invention.

What is claimed is:

1. An eclipse valve, comprising:
a housing having a cavity;
the cavity bounded by a front wall of the housing, a back wall opposite the front wall, and being open at a top of the housing;
a cover disposed at the top of the housing over the cavity, the cover having a plurality of through holes which pass though the cover from a top of the cover to a bottom of the cover, wherein each one of the plurality of through holes corresponds with a respective one of a plurality of threaded bores in the housing at the top of the housing and outside of the cavity;
a gasket disposed between the cover and a top of the front wall and a top of the back wall;
a front fitting formed at an outside of the front wall and including a front opening through the front wall;
a back fitting formed at an outside of the back wall and including a back opening through the back wall, wherein the front and back openings are aligned from front to back, wherein a flow axis is defined through the eclipse valve from the front fitting to the back fitting;
a first obturator plate disposed in the cavity against the front wall;
a second obturator plate disposed in the cavity against the back wall;
wherein the first and second obturator plates are configured to move within the cavity in opposite directions while remaining in contact with the front wall, the back wall, and each other;
the first obturator plate having an opening through the first obturator plate in a direction from the front wall to the back wall, the first obturator plate further having a drive extension which extends from a main portion of the first obturator plate;
the second obturator plate having an opening through the second obturator plate in a direction from the front wall to the back wall, the second obturator plate further having a drive extension which extends from a main portion of the second obturator plate opposite of and facing the drive extension of the first obturator plate in a direction from front to rear of the housing;
a driver element positioned horizontally between, and in contact with both the drive extension of the first obturator plate and the drive extension of the second obturator plate;
a drive shaft coupled to the driver element through the cover; and
wherein the first and second obturator plates are moveable, by rotation of the driver element, in the cavity between an open position where the opening through the first obturator plate and the opening through the second obturator plate are both aligned with each other and with the front opening and the back opening, and a closed position where the first and second obturator plates are moved in opposite directions relative to each other, and wherein in the closed position opening through the first obturator plate is completely unaligned from the front opening, the opening through the second obturator plate is completely unaligned from the back opening.

2. The eclipse valve of claim 1, wherein a center of the first obturator plate and a center of the second obturator plate are on a common axis in a direction from the front of the housing to the rear of the housing, wherein the driver element drives the first and second obturator plates to rotate in opposite directions about their centers, respectively.

3. The eclipse valve of claim 2, wherein the first and second obturator plates are circular about their respective centers.

4. The eclipse valve of claim 2, wherein an interface between the first obturator plate and the second obturator plate includes a bevel that, when moved to the closed position forces the first and second obturator plates outward relative to each other such that the first obturator plate is pressed against the front wall and the second obturator plate is pressed against the back wall.

5. The eclipse valve of claim 1, further comprising:
the first obturator plate includes an O-ring positioned between the first obturator plate and the front wall, wherein the O-ring defines a boundary that encircles the front opening in both the open and closed positions; and
the second obturator plate includes an O-ring positioned between the second obturator plate and the back wall, wherein the O-ring defines a boundary that encircles the back opening in both the open and closed positions.

6. The eclipse valve of claim 1, wherein the driver element is a horizontally oriented pinion gear having angled gear teeth wherein the top of the teeth are located farther outward than the bottom of the teeth.

7. The eclipse valve of claim 6, wherein the drive shaft is keyed to the pinion gear.

8. An eclipse valve, comprising:
a housing including a lower housing having a front wall and a back wall and defining a cavity that is open at a top of the lower housing, the housing further including a cover configured to cover and seal the cavity at the top of the lower housing, an axis of flow defined in a direction from the front wall to the back wall from an opening in front wall to an opening in the back wall;

the cover having a plurality of through holes which pass through the cover from a top of the cover to a bottom of the cover, wherein each one of the plurality of through holes corresponds with a respective one of a plurality of threaded bores in the housing at the top of the housing and outside of the cavity;

a first obturator plate disposed in the cavity having a horizontal center axis, a main portion, and a drive extension that extends outward from the main portion on a first side of the first obturator plate proximate the front wall of the lower housing, the drive extension comprising a plurality of gear teeth arranged in an arc around the center axis of the first obturator plate, and an opening formed in a horizontal direction through the first obturator plate that is completely offset from the center axis;

a second obturator plate disposed in the cavity having a horizontal center axis, a main portion, and a drive extension the extends outward from the main portion on a first side of the second obturator plate proximate the back wall of the lower housing, the drive extension comprising a plurality of gear teeth arranged in an arc around the center axis of the second obturator plate, and an opening formed in a horizontal direction through the second obturator plate that is completely offset from the center axis;

wherein the center axis of the first obturator plate and the center axis of the second obturator plate are coaxial, and wherein a second side of the first obturator plate, which is opposite the first side of the first obturator plate, is in contact with a second side of the second obturator plate, which is opposite the first side of the second obturator plate; and a drive gear positioned horizontally over the first and second obturator plates, the drive gearing having teeth that are engaged with the teeth of the drive extension of the first obturator plate and the teeth of the drive extension of the second obturator plate, wherein the drive gear is operable to turn the first obturator plate and the second obturator plate in opposite directions about their respective center axes, and wherein the drive gear is further operable to turn the first and second obturator plates between an open position in which the opening through the first obturator plate, the opening through the second obturator plate, the opening in the front wall and the opening in the back wall of the lower housing are aligned, and a closed position in which the opening through the first obturator plate and the opening through the second obturator plate are non-aligned.

9. The eclipse valve of claim 8, wherein:
the first side of the first obturator plate includes an O-ring that is in contact with the front wall of the lower housing and which encircles the opening through the front wall; and
the first side of the second obturator plate includes an O-ring that is in contact with the back wall of the lower housing and which encircles the opening through the back wall.

10. The eclipse valve of claim 8, wherein the second side of at least one of the first or second obturator plates comprises a beveled surface that causes the first and second obturator plates to be urged outward, against the front wall and the back wall, respectively, when the first and second obturator plates are in the closed position.

11. The eclipse valve of claim 8, wherein the drive gear is coupled to a shaft that extend through the cover of the housing.

* * * * *